US011753560B2

(12) United States Patent
Kameyama et al.

(10) Patent No.: US 11,753,560 B2
(45) Date of Patent: Sep. 12, 2023

(54) INK SET, RECORDING METHOD, AND PRINTED ITEM

(71) Applicants: TOYO INK SC HOLDINGS CO., LTD., Tokyo (JP); TOYOCOLOR CO., LTD., Tokyo (JP)

(72) Inventors: Yuji Kameyama, Tokyo (JP); Gosuke Kikutsuji, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 17/596,912

(22) PCT Filed: Jun. 3, 2020

(86) PCT No.: PCT/JP2020/021870
§ 371 (c)(1),
(2) Date: Dec. 21, 2021

(87) PCT Pub. No.: WO2020/261902
PCT Pub. Date: Dec. 30, 2020

(65) Prior Publication Data
US 2022/0325120 A1    Oct. 13, 2022

(30) Foreign Application Priority Data
Jun. 27, 2019   (JP) ................. 2019-119448

(51) Int. Cl.
*C09D 11/40*     (2014.01)
*C09D 11/322*    (2014.01)
*C09D 11/38*     (2014.01)
*B41M 5/00*      (2006.01)
*C09D 11/101*    (2014.01)
*C09D 11/32*     (2014.01)
*B41J 2/21*      (2006.01)

(52) U.S. Cl.
CPC ............. *C09D 11/40* (2013.01); *B41J 2/21* (2013.01); *B41J 2/2107* (2013.01); *B41M 5/00* (2013.01); *B41M 5/0023* (2013.01); *C09D 11/101* (2013.01); *C09D 11/32* (2013.01); *C09D 11/322* (2013.01); *C09D 11/38* (2013.01)

(58) Field of Classification Search
CPC ....... C09D 11/40; C09D 11/101; C09D 11/32; C09D 11/322; C09D 11/38; C09D 11/36; C09D 11/30; C09D 11/324; C09D 11/328; C09D 11/102; C09D 11/005; C09D 11/54; C09D 11/52; C09D 11/106; B41M 5/00; B41M 5/0023; B41M 5/0011; B41M 5/0017; B41M 5/0047; B41M 7/00; B41M 7/0072; B41M 5/52; B41M 5/5218; B41M 5/5227; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563

See application file for complete search history.

(56) References Cited

U.S. PATENT DOCUMENTS

| | | | |
|---|---|---|---|
| 8,653,153 B1 * | 2/2014 | Vanbesien ............ | C09D 11/322 520/1 |
| 8,669,298 B1 * | 3/2014 | Vanbesien ............ | G03G 9/131 522/74 |
| 2005/0039632 A1 | 2/2005 | Yamamoto et al. | |
| 2006/0189712 A1 | 8/2006 | Kondo | |
| 2007/0249750 A1 | 10/2007 | Oyanagi et al. | |
| 2008/0096998 A1 | 4/2008 | Oyanagi et al. | |
| 2009/0117286 A1 | 5/2009 | Ishikawa | |

(Continued)

FOREIGN PATENT DOCUMENTS

CN    103360863 A    10/2013
EP    1 457 535 A1   9/2004

(Continued)

OTHER PUBLICATIONS

Communication dated Nov. 14, 2022 by the Chinese Intellectual Property Office in counterpart Chinese Patent Application No. 202080047272.0.

(Continued)

*Primary Examiner* — Manish S Shah
(74) *Attorney, Agent, or Firm* — Sughrue Mion, PLLC

(57) ABSTRACT

An ink set for single-pass printing including at least a cyan ink, a magenta ink, a yellow ink, and a gray ink, wherein the magenta ink satisfies a specific condition regarding spectral reflectance, and the gray ink has a spectral reflectance at a wavelength of 500 nm of 20 to 70% and satisfies the specific condition regarding spectral reflectance.

13 Claims, No Drawings

(56) References Cited

U.S. PATENT DOCUMENTS

| | | | | |
|---|---|---|---|---|
| 2013/0139722 A1* | 6/2013 | Okamoto | ............ | C09D 11/322 |
| | | | | 524/110 |
| 2013/0303682 A1* | 11/2013 | Konda | ................ | C09D 11/101 |
| | | | | 524/548 |
| 2014/0171537 A1* | 6/2014 | Vanbesien | ............ | C09D 11/101 |
| | | | | 522/100 |
| 2016/0222233 A1* | 8/2016 | De Mondt | ................ | B41J 2/01 |
| 2017/0225460 A1* | 8/2017 | Strasemeier | ............ | B41J 2/515 |
| 2018/0079921 A1 | 3/2018 | Okamoto et al. | | |
| 2019/0143710 A1 | 5/2019 | Ikeda et al. | | |

FOREIGN PATENT DOCUMENTS

| | | | |
|---|---|---|---|
| EP | 1 690 904 A1 | | 8/2006 |
| EP | 1 892 105 A1 | | 2/2008 |
| EP | 1 911 814 A1 | | 4/2008 |
| EP | 3279279 A1 | * | 2/2018 ............ B41M 5/00 |
| JP | 2002-225317 A | | 8/2002 |
| JP | 2004-051881 A | | 2/2004 |
| JP | 2007-314744 A | | 12/2007 |
| JP | 2007-314775 A | | 12/2007 |
| JP | 2008-120991 A | | 5/2008 |
| JP | 2008-138045 A | | 6/2008 |
| JP | 2010-090281 A | | 4/2010 |
| JP | 2010-095583 A | | 4/2010 |
| JP | 2012-72368 A | | 4/2012 |
| JP | 2013-216784 A | | 10/2013 |
| JP | 2015-174334 A | | 10/2015 |
| WO | 2004/039899 A1 | | 5/2004 |
| WO | 2006/126416 A1 | | 11/2006 |
| WO | 2016/159037 A1 | | 10/2016 |
| WO | 2017/200031 A1 | | 11/2017 |

OTHER PUBLICATIONS

Japanese Office Action Notice of Reason for Refusal for JR 2019-218836 dated Feb. 3, 2020.
International Search Report for PCT/JP2020/021870 dated Aug. 11, 2020 [PCT/ISA/210].
Communication dated Jul. 26, 2022 from the Chinese Patent Office in Chinese Application No. 202080047272.0.
Extended European Search Report dated Jul. 22, 2022 in European Application No. 20830572.2.

* cited by examiner

INK SET, RECORDING METHOD, AND PRINTED ITEM

CROSS REFERENCE TO RELATED APPLICATIONS

This application is a National Stage of International Application No. PCT/JP2020/021870 filed Jun. 3, 2020, claiming priority based on Japanese Patent Application No. 2019-119448 filed Jun. 27, 2019.

TECHNICAL FIELD

The present invention relates to an ink set, a recording method, and a printed item, the ink set having excellent weather resistance and color reproducibility and improved granularity and metamerism.

BACKGROUND ART

In the past, various systems have been used as recording methods for forming images on the basis of image data signals on a recording medium such as paper. From thereamong, the inkjet system in which very fine droplets of ink are discharged and impacted from an inkjet head to form images and text is an inexpensive device, and since images are formed directly on the recording medium with ink being discharged only in required image sections, it is efficient and has a low running cost. In addition, the inkjet system is excellent as a low-noise recording method, and development is now being carried out into not only home or office document printing but also commercial and industrial printing. In particular, multi-pass wide-format (large format) inkjet printers which are suitable for printing large-format advertisements to be affixed to display windows and walls of buildings or the like have rapidly become widespread. Multi-pass is a method in which an inkjet head is moved multiple times (two times or more) back and forth in a sub-scanning direction with respect to a recording medium that is transported in a main scanning direction. Large-format advertisements are mainly used outdoors, and thus inks having excellent light resistance and coating film durability have been developed.

Meanwhile, in recent years, the inkjet system has come to be used instead of the offset system, the gravure system, and the flexo system not only for outdoor use but also for indoor printed items, corrugated cardboard printing, sticker labels, and the like. Thus, inks are required to be able to attain high image quality in addition to having light resistance and coating film durability.

Normally, inkjet printers use a cyan ink (C), a magenta ink (M), a yellow ink (Y), and a black ink (K), and these are each discharged from an inkjet head to reproduce any color. A gray color is reproduced using only K, or is reproduced using the three colors of CMY or the four colors of CMYK. When a gray color is reproduced using only K, ink dots are formed in an isolated manner in an image region where the amount of ink is small, which results in graininess, and what is referred to as the granularity of an image becomes an issue. Furthermore, when a gray color is reproduced using the three colors of CMY or the four colors of CMYK, the amount of ink increases by two to three times compared to when only K is used. Generally, since the granularity of an image becomes more noticeable as the number of ink dots decreases, from the viewpoint of granularity it is preferable for a gray color to be reproduced using the three colors of CMY or the four colors of CMYK.

However, when the three colors of CMY are used to reproduce a gray color, a phenomenon occurs where the color looks different depending on differences in the lighting and viewing angle, which is known as metamerism. A cause for metamerism occurring is that each color of CMY has a spectral reflectance curve with a different distribution, and the spectral reflectance of a gray color obtained by mixing these is no longer flat but uneven. If the amount of the three colors of CMY is reduced and the amount of K is increased, metamerism improves slightly but not to a satisfactory extent, and in addition granularity becomes a problem. Thus, there is a need for inks that are satisfactory in terms of both granularity and metamerism.

Furthermore, conventional multi-pass wide-format inkjet printers have low productivity, and thus there is a need for inks and recording methods that are suitable for single-pass inkjet printers which are capable of faster printing. Note that single-pass refers to a method in which printing is performed in a single pass onto a transported recording medium while the inkjet head is held in a fixed position.

In an attempt to improve metamerism, for example, Patent Document 1 discloses the preparation of a metamerism-improving ink which has a color equivalent to a specific tertiary color obtained by mixing the three types of primary color inks of cyan, magenta, and yellow, and has a spectral reflectance that is flatter than the spectral reflectance characteristics of the tertiary color. Further disclosed is a method in which at least one color in a color image is reproduced using the metamerism-improving ink and at least one of the three types of primary color inks, thereby making the spectral reflectance characteristics of the thus reproduced color flatter than when reproduced using a mixture of the three types of primary color inks.

Furthermore, for example, Patent Document 2 discloses an ink set including: a magenta ink which has a Z value of 83 or less in the case where a Y value in the XYZ display system specified by the CIE is 55, calculated from the ultraviolet-visible transmission spectrum of an ink diluted aqueous solution having a coloring material concentration of 0.01% by mass or less, and which has an $L^*$ value of 70 or less in the $L^*a^*b^*$ display system specified by the CIE for an aqueous solution diluted 1000 times in mass; a yellow ink which has an $L^*$ value of 95 or less in the $L^*a^*b^*$ display system specified by the CIE for an aqueous solution diluted 1000 times in mass; and a cyan ink which has an $L^*$ value of 70 or less in the $L^*a^*b^*$ display system specified by the CIE for an aqueous solution diluted 1000 times in mass, and also discloses an ink set further including a black ink having a different pigment concentration.

As an attempt to formulate inks suitable for a single-pass inkjet printer, for example, Patent Document 3 discloses an active energy ray-curable inkjet ink set in which the blend amount of a surface tension modifier blended in each ink is 1.0 to 5% by mass relative to the total amount of ink, and the difference in the blend amount of the surface tension modifier for each color is within 2% by mass at the maximum and the minimum in accordance with the printing order.

PRIOR ART DOCUMENTS

Patent Documents

Patent Document 1: Japanese Unexamined Patent Application Publication No. 2002-225317
Patent Document 2: International Publication No. 2004/039899

Patent Document 3: Japanese Unexamined Patent Application Publication No. 2013-216784

SUMMARY OF THE INVENTION

Problems to be Solved by the Invention

However, the metamerism-improving ink of Patent Document 1 above does not have flat spectral reflectance characteristics between 420 and 570 nm, and does not sufficiently improve metamerism. Furthermore, depending on the type of coloring material used for the cyan ink, magenta ink, and yellow ink, there may not be any improvement even if the metamerism-improving ink is used. In addition, Patent Document 1 above is an approach carried out using a multi-pass inkjet system, and in a single-pass inkjet system the metamerism-improving ink does not spread sufficiently on the cyan ink, magenta ink, and yellow ink, and the improvement in metamerism is not sufficient. Furthermore, in Patent Document 2 above, the weather resistance is not sufficient, and the improvement in metamerism is also not sufficient. In addition, in a single-pass inkjet system, the metamerism-improving ink does not spread sufficiently on the cyan ink, magenta ink, and yellow ink, and the improvement in metamerism is not sufficient. Furthermore, in Patent Document 3 above, the suppression of beading was not sufficient. Note that beading is a phenomenon in which ink droplets coalesce before the ink cures or dries, which causes banding in the printing direction and color mixing among inks.

The present invention has been developed in order to solve the problems described above, and provides an ink set, a recording method, and a printed item, the ink set being capable of obtaining a printed item having excellent weather resistance and color reproducibility and also improved granularity, metamerism, and beading.

Means to Solve the Problems

As a result of intensive investigation aimed at resolving the problems described above, the inventors of the present invention discovered that the ink set described below was able to resolve the above problems, thus enabling them to complete the present invention.

In other words, an embodiment of the present invention relates to an ink set for single-pass printing including at least a cyan ink, a magenta ink, a yellow ink, and a gray ink, wherein a spectral reflectance of the magenta ink satisfies formulas (1) to (3) below, the gray ink has a spectral reflectance at a wavelength of 500 nm of 20 to 70% and satisfies formulas (4) and (5) below, and all inks constituting the ink set are active energy ray-curable inks including a polymerizable compound and a polymerization initiator.

$$\text{(Spectral reflectance at a wavelength of 420 nm)} \div \text{(Spectral reflectance at a wavelength of 700 nm)} \times 100 \leq 40 \quad \text{Formula (1)}$$

$$\text{(Spectral reflectance at a wavelength of 500 nm)} \div \text{(Spectral reflectance at a wavelength of 700 nm)} \times 100 \leq 10 \quad \text{Formula (2)}$$

$$\text{(Spectral reflectance at a wavelength of 570 nm)} \div \text{(Spectral reflectance at a wavelength of 700 nm)} \times 100 \leq 20 \quad \text{Formula (3)}$$

$$80 \leq \text{(Spectral reflectance at a wavelength of 420 nm)} \div \text{(Spectral reflectance at a wavelength of 500 nm)} \times 100 \leq 110 \quad \text{Formula (4)}$$

$$80 \leq \text{(Spectral reflectance at a wavelength of 570 nm)} \div \text{(Spectral reflectance at a wavelength of 500 nm)} \times 100 \leq 110 \quad \text{Formula (5)}$$

Furthermore, another embodiment of the present invention relates to a recording method using the ink set for single-pass printing, wherein a step of printing the gray ink is performed after a step of printing the cyan ink, the magenta ink, and the yellow ink.

Furthermore, another embodiment of the present invention relates to a printed item obtained by printing the ink set for single-pass printing onto a substrate.

Furthermore, another embodiment of the present invention relates to a printed item that is printed using the recording method.

Effects of the Invention

Embodiments of the present invention are able to provide an ink set, a recording method, and a printed item, the ink set being capable of obtaining a printed item having excellent weather resistance and color reproducibility and also improved granularity, metamerism, and beading.

EMBODIMENTS FOR CARRYING OUT THE INVENTION

Embodiments for carrying out the present invention are described below in further detail. Note that the present invention is not limited to the embodiments described below, and various modifications can be made within the gist thereof.

An ink set for single-pass printing of the present invention is described below in detail using preferred embodiments.

Embodiments of the present invention are as follows.

[1] An ink set for single-pass printing including at least a cyan ink, a magenta ink, a yellow ink, and a gray ink, wherein a spectral reflectance of the magenta ink satisfies formulas (1) to (3) below, the gray ink has a spectral reflectance at a wavelength of 500 nm of 20 to 70% and satisfies formulas (4) and (5) below, and all inks constituting the ink set are active energy ray-curable inks including a polymerizable compound and a polymerization initiator.

$$\text{(Spectral reflectance at a wavelength of 420 nm)} \div \text{(Spectral reflectance at a wavelength of 700 nm)} \times 100 \leq 40 \quad \text{Formula (1):}$$

$$\text{(Spectral reflectance at a wavelength of 500 nm)} \div \text{(Spectral reflectance at a wavelength of 700 nm)} \times 100 \leq 10 \quad \text{Formula (2):}$$

$$\text{(Spectral reflectance at a wavelength of 570 nm)} \div \text{(Spectral reflectance at a wavelength of 700 nm)} \times 100 \leq 20 \quad \text{Formula (3):}$$

$$80 \leq \text{(Spectral reflectance at a wavelength of 420 nm)} \div \text{(Spectral reflectance at a wavelength of 500 nm)} \times 100 \leq 110 \quad \text{Formula (4):}$$

$$80 \leq \text{(Spectral reflectance at a wavelength of 570 nm)} \div \text{(Spectral reflectance at a wavelength of 500 nm)} \times 100 \leq 110 \quad \text{Formula (5):}$$

[2] The ink set for single-pass printing according to [1], wherein, when a hue angle defined in a CIELAB color space is H°, the hue angle H° of the cyan ink is 200 to 290°, the hue angle H° of the magenta ink is 0 to 45°, and the hue angle H° of the yellow ink is 80 to 110°.

[3] The ink set for single-pass printing according to [1] or [2], wherein a static surface tension at 25° C. of the gray ink is lower than a static surface tension at 25° C. of any of the cyan ink, the magenta ink, and the yellow ink.

[4] The ink set for single-pass printing according to any one of [1] to [3], further including a black ink.

[5] The ink set for single-pass printing according to any one of [1] to [4], wherein, in the polymerization initiator included in the gray ink, a total amount of a thioxanthone-based compound and an α-aminoalkylphenone-based compound is less than 3% by mass relative to a total mass of ink.

[6] A recording method using the ink set for single-pass printing according to any one of [1] to [5], wherein a step of printing the gray ink is performed after a step of printing the cyan ink, the magenta ink, and the yellow ink.

[7] The recording method according to [6], including a step of semi-drying or semi-curing a printed ink, between the step of printing the cyan ink, the magenta ink, and the yellow ink and the step of printing the gray ink.

[8] The recording method according to [6] or [7], including a step of printing the black ink after the step of printing the gray ink.

[9] A printed item obtained by printing the ink set for single-pass printing according to any one of [1] to [5] onto a substrate.

[10] A printed item that is printed using the recording method according to any one of [6] to [8].

<Ink Set for Single-Pass Printing>

An ink set for single-pass printing of embodiments of the present invention includes at least a cyan ink, a magenta ink, a yellow ink, and a gray ink, wherein the spectral reflectance of the magenta ink satisfies formulas (1) to (3), and the spectral reflectance of the gray ink is 20 to 70% at a wavelength of 500 nm and satisfies formulas (4) and (5).

(Spectral reflectance at a wavelength of 420 nm)÷(Spectral reflectance at a wavelength of 700 nm)×100≤40    Formula (1):

(Spectral reflectance at a wavelength of 500 nm)÷(Spectral reflectance at a wavelength of 700 nm)×100≤10    Formula (2):

(Spectral reflectance at a wavelength of 570 nm)÷(Spectral reflectance at a wavelength of 700 nm)×100≤20    Formula (3):

80≤(Spectral reflectance at a wavelength of 420 nm)÷(Spectral reflectance at a wavelength of 500 nm)×100≤110    Formula (4):

80≤(Spectral reflectance at a wavelength of 570 nm)÷(Spectral reflectance at a wavelength of 500 nm)×100≤110    Formula (5):

The ink set for single-pass printing of embodiments of the present invention includes at least a cyan ink, a magenta ink, a yellow ink, and a gray ink. By including the gray ink, there is an improvement in metamerism compared to when a gray color is reproduced with cyan, magenta, and yellow inks. Furthermore, there is an improvement in granularity compared to when a gray color is reproduced with only black.

<Spectral Reflectance>

In the ink set for single-pass printing, the spectral reflectance of the magenta ink satisfies formulas (1) to (3) above, and the spectral reflectance of the gray ink is 20 to 70% DONE wavelength of 500 nm and satisfies formulas (4) and (5) above. When the aforementioned spectral reflectance relationships of the magenta ink and gray ink are satisfied, the spectral reflectance curve of the gray color reproduced with at least the cyan ink, magenta ink, yellow ink, and gray ink can be flattened, and metamerism can be effectively improved.

From thereamong, from the viewpoint of improving metamerism, the spectral reflectance ratio represented by formula (1) is more preferably 25 or less, and the spectral reflectance ratio represented by formula (3) is more preferably 10 or less.

From the viewpoint of color reproducibility, the spectral reflectance at a wavelength of 700 nm of the magenta ink is preferably 60% or more, and from the viewpoint of metamerism, the spectral reflectance of the gray ink is preferably 30 to 60% at a wavelength of 500 nm.

As described later, for the magenta ink and gray ink forming part of the ink set for single-pass printing of embodiments of the present invention, conventional pigments that are already known can be used as desired, and a combination of two or more types of pigments may be used. Here, as a method of obtaining an ink set in which the spectral reflectances and ratios thereof satisfy formulas (1) to (5) above, in addition to optimization of the types and combinations of pigments used in the magenta ink and gray ink forming part of the ink set, the particle size distributions of the pigments are controlled to be within a preferred range. Regarding the latter, for example, it is preferable that the effect of Mie scattering caused by coarse pigment particles be reduced, and the median diameter (D50) of the magenta ink and gray ink is preferably 400 nm or less, and more preferably 300 nm or less. In addition, the 90% diameter (D90) is preferably 700 nm or less, and more preferably 500 nm or less. Note that the median diameter and the 90% diameter are volume-based values measured using a dynamic light scattering method, and can be measured using a Nanotrac UPA-EX150 manufactured by MicrotracBEL Corp., for example.

Furthermore, it is preferable that pigments having a small primary particle size be used so that the median diameter and 90% diameter of the pigments fall within the above ranges. Specifically, the average value of the primary particle size of the pigments used is preferably 10 to 200 nm, and more preferably 20 to 150 nm. Note that the primary particle size of the pigments can be measured using a transmission electron microscope (TEM). Specifically, the average values for the short axis diameter and the long axis diameter are calculated from a TEM image for 100 arbitrarily selected pigment particles, and then the average value of the two types of average values obtained (short axis diameter and long axis diameter) is used as the primary particle size of a pigment.

In order to simultaneously satisfy formulas (1) to (3) above, in the magenta ink forming part of the ink set for single-pass printing of embodiments of the present invention, the value obtained by dividing the 90% diameter by the primary particle size of the pigments is preferably 2 to 20, and more preferably 3 to 12. Furthermore, in order to satisfy formulas (4) and (5) above, in the gray ink forming part of the ink set for single-pass printing of embodiments of the present invention, the value obtained by dividing the 90% diameter by the primary particle size of the pigments is preferably 2 to 30, and more preferably 3 to 15.

However, the primary particles in a pigment generally used for a magenta ink aggregate strongly together compared to pigments of other colors, and thus it is difficult to achieve the preferred median diameter and 90% diameter described above. Accordingly, when producing the magenta ink forming part of the ink set for single-pass printing of embodiments of the present invention, it is preferable that the dispersion conditions be optimized.

Specifically, it is preferable that a media-stirring dispersion device such as a beads mill be used, and that zirconia beads having a diameter of 0.3 to 1.5 mm be used as the media. Note that the diameter of the zirconia beads is more preferably 0.3 to 1.0 mm.

Generally, the smaller the size of the media, the higher the dispersion efficiency, but the harder it becomes to break up strong aggregations. Zirconia beads have a high specific gravity and sufficient kinetic energy even when small in size, and thus they can sufficiently and efficiently break up even strongly aggregated pigments.

Furthermore, the properties of zirconia beads can be adjusted by adding compounds such as calcium oxide, yttrium oxide, and aluminum oxide (alumina) to zirconia. The zirconia beads preferably used in embodiments of the present invention have a Vickers hardness of 1,100 to 1,350 Hv.

By dispersing pigments using zirconia beads having the above Vickers hardness, it is possible to suppress deterioration in dispersion efficiency due to insufficient hardness of the zirconia beads and to also prevent the inclusion of worn out zirconia beads, and thus it is possible to efficiently break up the pigments. As a result, it is possible to obtain a printed item having excellent color reproducibility and improved metamerism, and in the case where the ink set for single-pass printing of embodiments of the present invention is a set of active energy ray-curable inks described later, there is also an improvement in the curability and storage stability of the inks.

Furthermore, when dispersing using a media-stirring dispersion device, it is extremely important to control the peripheral speed of the stirring blade. In order to produce a magenta ink that simultaneously satisfies formulas (1) to (3) above, the optimum peripheral speed of the stirring blade is 8 to 13 m/s, and more preferably 9 to 12 m/s. By implementing this kind of control, a pigment can be made to be sufficiently fine in a comparatively short period of time, and it is possible to obtain a magenta ink that simultaneously satisfies formulas (1) to (3) above. In addition, it is possible to obtain a magenta ink that combines favorable weather resistance, color reproducibility, discharge stability, and storage stability without excessive dispersion.

In addition, in the case where the ink set for single-pass printing of embodiments of the present invention is a set of active energy ray-curable inks described later, if the inks have a high water content, this may cause reaggregation of pigments, making it difficult to satisfy formulas (1) to (3) above. From this viewpoint, the amount of water in the magenta ink and the gray ink is preferably 3% by mass or less, more preferably 2.5% by mass or less, and particularly preferably 2% by mass or less.

In the description and the like of the present invention, "spectral reflectance" is a value calculated by forming an image having a dot area percent of 100% (equivalent to a wet film thickness of 8 μm) and measuring reflectance at wavelengths of 400 to 700 nm using a viewing angle of 2°, illuminant D65, and a CIE color system. Furthermore, the X-Rite 500 Series manufactured by X-Rite, Inc. is used as a measuring device.

Note that dot area percent means the proportion of the area of dots per unit area when expressed as a percentage.

<Hue Angle H°>

In terms of a hue angle H° defined in the CIELAB color space, it is preferable that the ink set for single-pass printing of embodiments of the present invention satisfies a relationship in which the hue angle H° of the cyan ink is 200 to 290°, the hue angle H° of the magenta ink is 0 to 45°, and the hue angle H° of the yellow ink is 80 to 110°. More preferable are a hue angle H° for the cyan ink of 200 to 270°, a hue angle H° for the magenta ink of 10 to 40°, and a hue angle H° for the yellow ink of 90 to 110°. An image having high color reproducibility can be obtained when within the aforementioned ranges.

In the description and the like of the present invention, "hue angle H°" means a correlation amount calculated based on HS Z 8781-4:2013. The hue angle H° is obtained by $H°=\tan^{-1}(b^*/a^*)+180$ (when $a^*<0$) or $H°=\tan^{-1}(b^*/a^*)+360$ (when $a^*>0$). Note that "$a^*$" and "$b^*$" in the above formulas are values in the CIE 1976 $L^*a^*b^*$ color space for when an image having a 100% dot area percent is formed. Furthermore, the X-Rite 500 Series manufactured by X-Rite, Inc. is used as a measuring device.

Components that are included or may be included in the cyan ink, magenta ink, yellow ink, and gray ink constituting the ink set for single-pass printing of embodiments of the present invention will be described hereinafter.

The cyan ink, magenta ink, yellow ink, and gray ink include at least a pigment.

<Pigment in the Cyan Ink>

There are no particular limitations on the pigment that can be used in the cyan ink in embodiments of the present invention, and a publicly-known pigment can be used. Both inorganic pigments and organic pigments may be used as the pigment. Pigments that are generally used in printing applications and coating material applications may be used, and a suitable pigment may be selected from among such pigments in accordance with the required application in terms of color reproducibility, weather resistance, and so forth.

In detail, examples of pigments that exhibit a cyan color, as indicated by the C.I. Color Index, include C.I. Pigment Blue 1, 2, 14, 15, 15:1, 15:2, 15:3, 15:4, 15:6, 60, and 62. From thereamong, from the viewpoint of color reproducibility, C.I. Pigment Blue 15:3 and 15:4 are preferred. In embodiments of the present invention, one type of the pigments exhibiting a cyan color may be used alone or a combination of two or more types may be used.

The content of pigment exhibiting a cyan color within the cyan ink is preferably 0.1 to 10% by mass, and more preferably 1 to 10% by mass, relative to the total mass of the cyan ink.

<Pigment in the Magenta Ink>

There are no particular limitations on the pigment that can be used in the magenta ink in embodiments of the present invention, and a publicly-known pigment can be used, provided that it is possible to obtain a magenta ink having a spectral reflectance that satisfies the aforementioned relationships. Both inorganic pigments and organic pigments may be used as the pigment. Pigments that are generally used in printing applications and coating material applications may be used, and a suitable pigment may be selected from among such pigments in accordance with the required application in terms of color reproducibility, weather resistance, and so forth.

Examples of pigments that exhibit a magenta color and facilitate production of a magenta ink having a spectral reflectance that satisfies the aforementioned relationships, as indicated by the C.I. Color Index, include C.I. Pigment RED 48:1, 112, 146, 166, 177, 179, 202, 237, 242, 254, 255, 264, 282, and C.I. Pigment Violet 19. From thereamong, C.I. Pigment RED 112, 146, 166, 177, 179, 202, 237, 254, 255, and 264 are preferred. When these pigments are used it is easy to produce a magenta ink that simultaneously satisfies formulas (1) to (3) above even without optimizing the dispersion conditions as described above.

In embodiments of the present invention, one type of the above pigments exhibiting a magenta color may be used alone or a combination of two or more types may be used. Furthermore, pigments exhibiting a magenta color other than the above may be combined and used provided that the spectral reflectance of the magenta ink satisfies the aforementioned relationships.

In particular, by mixing pigments such as C.I. Pigment RED 146, 166, and 254 that have high color reproducibility in the red region, with pigments such as C.I. Pigment RED 122 and C.I. Pigment Violet 19 that have high color reproducibility in the blue region, it is possible reproduce a good gamut in the red and blue regions while also improving metamerism.

The content of the pigment exhibiting a magenta color in the magenta ink is preferably 0.1 to 10% by mass, and more preferably 2 to 10% by mass, relative to the total mass of the magenta ink.

<Pigment in the Yellow Ink>

There are no particular limitations on the pigment that can be used in the yellow ink in embodiments of the present invention, and a publicly-known pigment can be used. Both inorganic pigments and organic pigments may be used as the pigment. Pigments that are generally used in printing applications and coating material applications may be used, and a suitable pigment may be selected from among such pigments in accordance with the required application in terms of color reproducibility, weather resistance, and so forth.

In detail, examples of pigments that exhibit a yellow color, as indicated by the C.I. Color Index, include C.I. Pigment Yellow 1, 2, 3, 12, 13, 14, 16, 17, 18, 24, 73, 74, 75, 83, 93, 95, 97, 98, 100, 108, 109, 110, 114, 120, 128, 129, 138, 139, 174, 150, 151, 154, 155, 167, 180, 185, and 213. From thereamong, pigments having a spectral reflectance that begins to gradually increase from a wavelength in the vicinity of 450 nm and is high at a wavelength of 550 to 600 nm are preferred, and by using a yellow pigment having this kind of spectral reflectance, it is possible to further flatten the spectral reflectance of a printed item that uses a cyan ink and a yellow ink and to improve metamerism. From the viewpoint of an optimum spectral reflectance that improves metamerism, C.I. Pigment Yellow 150, 184, and 185 are preferred, and from the viewpoint of weather resistant color reproduction, C.I. Pigment Yellow 150 is more preferred. In embodiments of the present invention, one type of the above pigments exhibiting a yellow color may be used alone or a combination of two or more types may be used.

The content of pigment exhibiting a yellow color in the yellow ink is preferably 0.1 to 10% by mass, and more preferably 1 to 10% by mass, relative to the total mass of the yellow ink.

<Pigment in the Gray Ink>

There are no particular limitations on the pigment that can be used in the gray ink in embodiments of the present invention, and a publicly-known pigment can be used, provided that it is possible for the spectral reflectance to satisfy the aforementioned relationships. Both inorganic pigments and organic pigments may be used as the pigment. Pigments that are generally used in printing applications and coating material applications may be used, and a suitable pigment may be selected from among such pigments in accordance with the required application in terms of color reproducibility, weather resistance, and so forth.

In detail, as indicated by the C.I. Color Index, examples include C. I. Pigment Black 1, 6, 7, 9, 10, 11, 28, 26, and 31. From thereamong, C.I. Pigment Black 7 is preferred. In embodiments of the present invention, one type of the above pigments may be used alone or a combination of two or more types may be used.

The content of pigment in the gray ink is preferably 0.2 to 1% by mass, and more preferably 0.35 to 0.9% by mass, relative to the total mass of the gray ink.

In addition, from the viewpoint of improving metamerism, the gray ink may include a pigment that exhibits a cyan color or/and a pigment that exhibits a magenta color.

The ink set for single-pass printing of embodiments of the present invention may include an ink other than a cyan ink, a magenta ink, a yellow ink, and a gray ink. Examples include a black ink, a white ink, a green ink, a violet ink, and an orange ink. From thereamong, from the viewpoint of improving metamerism, it is preferable that a black ink be included.

Examples of pigments that exhibit a black color include C.I. Pigment Black 1, 6, 7, 9, 10, 11, 28, 26, and 31. From thereamong, C.I. Pigment Black 7 is preferred. In embodiments of the present invention, one type of the above pigments exhibiting a black color may be used alone or a combination of two or more types may be used.

The content of pigment exhibiting a black color in the black ink is preferably greater than 1% by mass and less than or equal to 10% by mass, and more preferably 2 to 10% by mass, relative to the total mass of the black ink.

In embodiments of the present invention, it is more preferable to use pigments that have the same C.I. Color Index for pigments for the gray ink and the black ink. From thereamong, it is preferable that C.I. Pigment Black 7 be used as the black ink and the gray ink.

In addition, from the viewpoint of excellent image quality formation, the content of pigment in the gray ink is preferably 5 to 50% by mass, and more preferably 10 to 40% by mass, relative to the content of pigment in the black ink. When the content of pigment in the gray ink and the black ink satisfies the aforementioned ranges, metamerism can be effectively improved and high image quality can be obtained.

Examples of pigments that exhibit a white color include C.I. Pigment White 5, 6, 7, 12, and 28.

Examples of pigments that exhibit a green color include C.I. Pigment Green 1, 2, 3, 4, 7, 8, 10, 15, 17, 26, 36, 45, and 50.

Examples of pigments that exhibit a violet color include C.I. Pigment Violet 1, 2, 3, 4, 5:1, 12, 13, 15, 16, 17, 19, 23, 25, 29, 31, 32, 36, 37, 39, and 42.

Examples of pigments that exhibit an orange color include C.I. Pigment Orange 13, 16, 20, 34, 36, 38, 39, 43, 51, 61, 63, 64, and 74.

There are no particular limitations on components other than pigments provided that it is possible for the spectral reflectance of the magenta ink and the gray ink to satisfy the aforementioned relationships, and, for example, in the case of an aqueous ink, examples include a pigment dispersant, water, an organic solvent, resin, a surface tension modifier, and an anti-foaming agent, and in the case of an active energy ray-curable ink, examples include a pigment dispersant, a polymerizable compound, a polymerization initiator, an organic solvent, a surface tension modifier, an anti-foaming agent, an antioxidant, resin, and water. From thereamong, from the viewpoints of coating film durability and productivity, an active energy ray-curable ink including a polymerizable compound and a polymerization initiator is preferred.

Hereinafter, in the case where the ink set for single-pass printing of embodiments of the present invention is a set of active energy ray-curable inks, components other than pigments that can be used for the active energy ray-curable inks will be described in detail.

<Polymerizable Compounds>

In the description and the like of the present invention, unless specifically stated otherwise, the terms "(meth)acryloyl", "(meth)acrylic acid", "(meth)acrylate" and "(meth)acryloyloxy" mean "acryloyl and/or methacryloyl", "acrylic acid and/or methacrylic acid", "acrylate and/or methacrylate" and "acryloyloxy and/or methacryloyloxy" respectively. Furthermore, "PO" represents "propylene oxide" and "EO" means "ethylene oxide".

There are no particular limitations on the polymerizable compound that can be used in embodiments of the present invention, and it is possible to use publicly-known polymerizable or crosslinkable materials that exhibit a radical polymerization reaction, cationic polymerization reaction, dimerization reaction, or the like. From thereamong, from the viewpoints of coating film durability, adhesion, and curability, a radical polymerizable compound is preferable, and an addition polymerizable compound having at least one ethylenic unsaturated double bond is even more preferable. Specifically, a polymerizable compound having a (meth)acryloyl group, allyl group, vinyl group, vinyl ether group, and inner double bonding group (such as maleic acid) within the molecule is preferred. From thereamong, from the viewpoint of curability, a polymerizable compound having a (meth)acryloyl group (other than a polymerizable compound having a (meth)acryloyl group and vinyl ether group), a polymerizable compound having a vinyl group, and a polymerizable compound having a (meth)acryloyl group and vinyl ether group are even more preferred. In embodiments of the present invention, one type of the above polymerizable compounds may be used alone or a combination of two or more types may be used.

Specific examples of polymerizable compounds having a (meth)acryloyl group include 2-ethylhexyl (meth)acrylate, 2-hydroxyethyl (meth)acrylate, 2-hydroxypropyl (meth)acrylate, β-carboxylethyl (meth)acrylate, 4-t-butylcyclohexanol (meth)acrylate, tetrahydrofurfuryl acrylate, alkoxylated tetrahydrofurfuryl acrylate, caprolactone (meth)acrylate, lauryl (meth)acrylate, stearyl (meth)acrylate, isoamyl (meth)acrylate, 2-phenoxyethyl (meth)acrylate, isodecyl (meth)acrylate, 3,3,5-trimethylcyclohexanol (meth)acrylate, cyclohexyl (meth)acrylate, isobornyl (meth)acrylate, norbornyl (meth)acrylate, dicyclopentanyl (meth)acrylate, dicyclopentenyl (oxyethyl) (meth)acrylate, 1,4-cyclohexanedimethanol (meth)acrylate, cyclic trimethylolpropane formal (meth)acrylate, benzyl (meth)acrylate, EO-modified nonylphenol acrylate, (2-methyl-2-ethyl-1,3-dioxolane-4-yl) methyl acrylate, acryloyl morpholine, (poly)ethylene glycol di(meth)acrylate, 1,6-hexanediol di(meth)acrylate, 1,9-nonanediol di(meth)acrylate, 1,10-decanediol di(meth)acrylate, neopentyl glycol di(meth)acrylate, hydroxypivalic acid neopentyl glycol di(meth)acrylate, dipropylene glycol di(meth)acrylate, (neopentyl glycol-modified) trimethylolpropane di(meth)acrylate, tripropylene glycol di(meth)acrylate, dimethyloltricyclodecane di(meth)acrylate, EO adduct of bisphenol A di(meth)acrylate, EO adduct of bisphenol F di(meth)acrylate, PO adduct of bisphenol A di(meth)acrylate, cyclohexanedimethanol di(meth)acrylate, dimethylol-tricyclodecan di(meth)acrylate, dicyclopentanyl di(meth)acrylate, trimethylolpropane tri(meth)acrylate, ε-caprolactone-modified tris-(2-acryloxyethyl) isocyanurate, ethoxylated isocyanuric acid tri(meth)acrylate, tris (2-hydroxyethyl) isocyanurate tri(meth)acrylate, pentaerythritol tri(meth)acrylate, trimethylolpropane tri(meth)acrylate, ethoxylated (3) trimethylolpropane tri(meth)acrylate, pentaerythritol tetra(meth)acrylate, ditrimethylolpropane tetra(meth)acrylate, dipentaerythritol penta(meth)acrylate, and dipentaerythritol hexa(meth)acrylate.

Specific examples of polymerizable compounds having a vinyl group include N-vinylcarbazole, 1-vinylimidazole, N-vinyl-2-pyrrolidone, N-vinylcaprolactam, and N-vinylformamide.

Specific examples of polymerizable compounds having a (meth)acryloyl group and a vinyl ether group include (meth)acrylic acid 2-vinyloxyethyl, (meth)acrylic acid 3-vinyloxypropyl, (meth)acrylic acid 1-methyl-2-vinyloxyethyl, (meth)acrylic acid 2-vinyloxypropyl, (meth)acrylic acid 2-(2-vinyloxyethoxy) ethyl, (meth)acrylic acid 2-(1-vinyloxyethoxy) ethyl, (meth)acrylic acid 2-(vinyloxy isopropoxy) ethyl, and (meth)acrylic acid 2-(vinyloxyethoxy) propyl.

A polymerizable oligomer may be included as a polymerizable compound. A polymerizable oligomer preferably has a (meth)acryloyl group as an ethylenic unsaturated bond within the molecule. From the viewpoint of achieving a balance between flexibility and curability, the number of ethylenic unsaturated bonds included in the oligomer is preferably 1 to 15 per molecule, more preferably 2 to 6, even more preferably 2 to 4, and particularly preferably 2. The weight average molecular weight of the oligomer is preferably 400 to 10,000, and more preferably 500 to 5,000. Here, the "weight average molecular weight" can be obtained as a styrene-equivalent molecular weight by means of general gel permeation chromatography (hereinafter referred to as GPC).

Examples of polymerizable oligomers include urethane acrylate oligomers such as aliphatic urethane acrylate oligomers and aromatic urethane acrylate oligomers, acrylic ester oligomers, polyester acrylate oligomers, and epoxy acrylate oligomers. In terms of extensibility, aliphatic urethane acrylate oligomers and aromatic urethane acrylate oligomers are preferred. Furthermore, one type of the above polymerizable oligomers may be used alone or a combination of two or more types may be used.

In the magenta ink forming part of the ink set for single-pass printing of embodiments of the present invention, it is preferable that a polymerizable compound having at least a (meth)acryloyl group and a vinyl ether group be included as a polymerizable compound. In particular, when used in combination with one or more types of pigment selected from the group consisting of C.I. Pigment RED 112, 146, 166, 177, 179, 202, 237, 254, 255, and 264 described above, although the details are unclear, reaggregation of pigments can be suppressed, and as a result it becomes possible to produce a printed item having excellent long-term weather resistance and color reproducibility as well as improved metamerism.

Furthermore, although the details are unclear, setting the blend amount of an addition polymerizable compound having only one ethylenic unsaturated double bond to 50% by mass or less of the total amount of polymerizable compound included in the ink results in an ink have improved metamerism, coating film durability, and curability for printed items. Note that the blend amount of the addition polymerizable compound having only one ethylenic unsaturated double bond is more preferably 25% by mass or less of the total amount of polymerizable compound included in the ink.

In addition, setting the blend amount of the aforementioned polymerizable compound having a vinyl group to 15% by mass or less of the total amount of ink suppresses reaggregation of pigments and results in a printed item having improved metamerism. Note that the blend amount of the polymerizable compound having a vinyl group is more preferably 10% by mass or less of the total amount of ink.

<Polymerization Initiator>

There are no particular limitations on the types of polymerization initiator that can be used in embodiments of the present invention, and publicly-known polymerization initiators can be used. Furthermore, one type of polymerization initiator may be used alone or a combination of two or more types may be used. Note that polymerization initiators include not only compounds that absorb external energy such as active energy rays to produce a polymerization-initiating species, but also compounds that absorb specific active energy rays to promote the decomposition of the polymerization initiator (so-called sensitizers).

Specific examples of the polymerization initiator include, as acylphosphine oxide-based compounds, diphenylacylphenylphosphine oxide, ethoxy(2,4,6-trimethylbenzoyl)phenylphosphine oxide, 2,4,6-trimethylbenzoyl-diphenylphosphine oxide, and bis(2,4,6-trimethylbenzoyl)-phenylphosphine oxide.

As thioxanthone-based compounds, examples include thioxanthone, 2-isopropylthioxanthone, 4-isopropylthioxanthone, 2-chlorothioxanthone, 2,4-dimethylthioxanthone, and 2,4-diethylthioxanthone.

As α-aminoalkylphenone-based compounds, examples include 2-methyl-1-[4-(methoxythio)-phenyl]-2-morpholinopropane-1-one, 2-benzyl-2-dimethyl amino-1-(4-morpholinophenyl)-1-butanone, and 2-(dimethylamino)-2-[(4-methylphenyl)methyl]-1-[4-(4-morpholinyl)phenyl]-1-butanone.

As benzophenone-based compounds, examples include benzophenone, 4-phenylbenzophenone, isophthalphenone, and 4-benzoyl-4'-methyl-diphenylsulfide.

As α-hydroxyalkylphenone-based compounds, examples include 1-hydroxycyclohexylphenyl ketone, 2-hydroxy-2-methyl-1-phenylpropan-1-one, and oligo(2-hydroxy-2-methyl-1-(4-(1-methylvinyl)phenyl)propanone).

As amine-based compounds, examples include trimethylamine, methyl dimethanolamine, triethanolamine, p-diethylaminoacetophenone, ethyl p-dimethylaminobenzoate, isoamyl p-dimethylaminobenzoate, N,N-dimethylbenzylamine, ethyl-4-dimethylaminobenzoate, 4,4'-bis(diethylamino)benzophenone, and ethylhexyl-4-dimethylaminobenzoate. In embodiments of the present invention, one type of the above polymerization initiators may be used alone or a combination of two or more types may be used.

The content of the polymerization initiator, relative to the total mass of the polymerizable compound, is preferably 5 to 20% by mass, and more preferably 5 to 15% by mass.

In an active energy ray-curable ink, the hue and metamerism of the ink coating film changes depending on the polymerization initiator used. In addition, an intense active energy ray is radiated to cure the ink. Decomposition of the polymerization initiator thereby also results in a change in the hue and metamerism of the ink coating film. This is particularly notable in image regions where the amount of ink is small, and in light colors such as gray ink.

Among the polymerization initiators, with thioxanthone-based compounds there is yellowing of the ink coating film and a shift in hue in light colors such as gray ink. Furthermore, α-aminoalkylphenone-based compounds cause metamerism due to having fluorescence emission at wavelengths in the vicinity of 385 nm.

Thus, in embodiments of the present invention, from the viewpoints of hue and metamerism, the total amount of thioxanthone-based compound and α-aminoalkylphenone-based compound in the gray ink is preferably less than 3% by mass relative to the total mass of the ink, and is more preferably 2% by mass or less. Particularly in the case of embodiments of the present invention, from the viewpoint of curability, it is more preferable that the blend amount of α-aminoalkylphenone-based compound be less than the blend amount of thioxanthone-based compound.

In embodiments of the present invention, from the viewpoint of curability, the total amount of thioxanthone-based compound and α-aminoalkylphenone-based compound in the cyan ink, the magenta ink, and the yellow ink is preferably less than 7% by mass relative to the total mass of the ink, and is more preferably 5% by mass or less. Particularly in the case of embodiments of the present invention, from the viewpoint of curability, it is more preferable that the blend amount of α-aminoalkylphenone-based compound be less than the blend amount of thioxanthone-based compound.

<Surface Tension Modifier>

In the description and the like of the present invention, a "surface tension modifier" means a substance that lowers the surface tension of an ink upon addition thereto. Examples of surface tension modifiers include silicone-based surface tension modifiers, fluorine-based surface tension modifiers, acrylic-based surface tension modifiers, and acetylene glycol-based surface tension modifiers. From the viewpoint of surface tension reduction capability, use of a silicone-based surface tension modifier is preferred.

Specific examples of silicone-based surface tension modifiers include modified products of dimethylsiloxane backbones. From thereamong, polyether-modified siloxane-based surface tension modifiers are preferred. Note that the polyether may be polyethylene oxide and/or polypropylene oxide, for example. In embodiments of the present invention, a polyether-modified siloxane-based surfactant that can be obtained commercially can be used.

Examples of representative products that can be preferably used include BYK (registered trademark)-331, 333, 348, 349, 378, UV3500, and UV3510, all manufactured by BYK-Chemie GmbH. Additional examples include TEGO (registered trademark) Glide 450, 440, 435, 432, 410, 406, 130, 110, and 100, manufactured by Evonik Degussa GmbH. From thereamong, from the viewpoint of improving image quality, BYK-331, 333, 348, 378, and UV3510, and TEGO Glide 450, 440, 432, and 410, for example, are preferred.

The content of the silicone-based surface tension modifier is preferably 0.1 to 2.0% by mass in the gray ink, and is preferably 0.01 to 0.3% by mass in the cyan ink, the magenta ink, and the yellow ink, relative to the total mass of the ink.

<Other Components>

The active energy ray-curable ink may also include a pigment dispersant, polymerization inhibitor, organic solvent, anti-foaming agent, antioxidant, resin, water, and the like in addition to the components described above if necessary.

<Pigment Dispersant>

In embodiments of the present invention, a pigment dispersant is preferably used to improve the pigment dispersibility and the storage stability of the ink. There are no particular limitations on the types of pigment dispersant that can be used in embodiments of the present invention, and publicly-known pigment dispersants can be used. From thereamong, resin pigment dispersants having basic functional groups are preferred, and examples of the basic functional groups may include primary, secondary, or tertiary amino groups, and nitrogen-containing heterocycles such as pyridine, pyrimidine, and pyrazine.

Furthermore, in terms of the backbone that constitutes the resin pigment dispersant, aliphatic amine backbones and/or urethane backbones are even more preferred as they enable a pigment dispersion of favorable storage stability to be easily obtained.

The pigment dispersant preferably has a weight average molecular weight of 5,000 to 50,000, an acid value (mgKOH/g) of 5 to 20, and an amine value (mgKOH/g) of 20 to 50. Note that the "acid value" represents the acid value per 1 g of the dispersant solid fraction, and can be obtained by a potentiometric titration method in accordance with JIS K 0070. Furthermore, the "amine value" represents the amine value per 1 g of the dispersant solid fraction, and can be obtained by a method based on JIS K 7237, for example, using a 0.1 N aqueous solution of hydrochloric acid, determining the amount of the aqueous solution of hydrochloric acid used for neutralization by a potentiometric titration method, and then converting this to an equivalent amount of potassium hydroxide.

Specific examples of the pigment dispersant include Solsperse 32000, 76400, 76500, J100, and J180 manufactured by The Lubrizol Corporation, and Disperbyk-161, 162, 163, 164, 165, 166, 167, 168, and 190.

The content of the pigment dispersant may be selected as desired to ensure the desired stability. For example, inks having superior fluidity characteristics typically contain 25 to 150 parts by mass of a pigment dispersant relative to 100 parts by mass of the pigment. When the pigment dispersant is used in an amount within this range, the dispersion stability of the inks is favorable, and even after a long period of time, quality similar to that initially obtained tends to be achievable.

<Polymerization Inhibitor>

A polymerization inhibitor may be used to increase the ink storage stability. Examples of compounds that may be particularly favorably used as a polymerization inhibitor include hindered phenol-based compounds, phenothiazine-based compounds, hindered amine-based compounds, and phosphorus-based compounds. Specific examples include 4-methoxyphenol, hydroquinone, methylhydroquinone, t-butylhydroquinone, 2,6-di-t-butyl-4-methylphenol, phenothiazine, and the aluminum salt of N-nitrosophenylhydroxylamine. From thereamong, it is preferable that hindered phenol-based compounds and/or phenothiazine-based compounds be included, and it is more preferable that 2,6-di-t-butyl-4-methylphenol and phenothiazine be included.

From the viewpoint of increasing stability over time while maintaining curability, the content of the polymerization inhibitor is preferably 0.01 to 2% by mass relative to the total mass of the ink.

<Organic Solvent>

In the present embodiments, an organic solvent may be included to reduce the viscosity of the active energy ray-curable ink and to improve wettability on the recording medium. The boiling point of the organic solvent is preferably 120 to 300° C., more preferably 140 to 270° C., and even more preferably 160 to 260° C.

Examples of the organic solvent include monoacetates, diacetates, diols, monoalkyl ethers, dialkyl ethers, and lactic acid esters of glycol compounds. From thereamong, monoacetates, monoalkyl ethers, and dialkyl ethers of glycol compounds are preferred. More specifically, tetraethylene glycol dialkyl ether, ethylene glycol monobutyl ether acetate, and diethylene glycol diethyl ether are preferred.

The content of the organic solvent is preferably 0.1 to 10% by mass relative to the total mass of the ink. By ensuring that the content of the organic solvent falls within this range, favorable results can be easily obtained for the characteristics of curability, discharge stability, and adhesion. From the viewpoint of curability, the content of the organic solvent is more preferably 0.2 to 5% by mass relative to the total mass of the ink. In addition, in terms of discharge stability, 0.5 to 4% by mass is preferred.

<Ink Properties>
<Static Surface Tension>

In embodiments of the present invention, the static surface tension at 25° C. of the gray ink is preferably lower than the static surface tension at 25° C. of any of the cyan ink, the magenta ink, and the yellow ink. In addition, from the viewpoint of improving metamerism, the static surface tension at 25° C. of the gray ink is more preferably 1 mN/m or more lower than the static surface tension at 25° C. of any of the cyan ink, the magenta ink, and the yellow ink. When the static surface tension satisfies the aforementioned relationship, the gray ink wets and spreads on an image formed by the cyan ink, magenta ink, and yellow ink, and thus metamerism is effectively improved.

In addition, in embodiments of the present invention, it is preferable that the static surface tension of the inks be 18 to 30 mN/m, and it is more preferable that the static surface tension of the gray ink be 19 to 24 mN/m and the static surface tension of the cyan ink, magenta ink, and yellow ink be 20 to 25 mN/m. When the static surface tension satisfies the aforementioned ranges, the gray ink wets and spreads on an image formed by the cyan ink, magenta ink, and yellow ink, and thus metamerism is effectively improved and discharge properties in inkjet printing are favorable.

<Viscosity>

From the viewpoint of printing using an inkjet system, the cyan ink, the magenta ink, the yellow ink, and the gray ink constituting the ink set for single-pass printing of embodiments of the present invention preferably have a viscosity at 25° C. of 40 mPa·s or less. More preferable is 5 to 40 mPa·s, and even more preferable is 7 to 30 mPa·s.

<Recording Method>

In a recording method of embodiments of the present invention, a step of printing the gray ink (hereinafter also referred to as the "gray ink printing step") is performed after having performed a step of printing the cyan ink, the magenta ink, and the yellow ink included in the ink set for single-pass printing (hereinafter also referred to as the "ink printing step").

By forming an image by the gray ink on an image formed by the cyan ink, the magenta ink, and the yellow ink, reflectance of the printed item flattens and metamerism can be effectively improved. <Ink Printing Step>

In embodiments of the present invention, from the viewpoint of productivity, printing is preferably performed in the ink printing step by means of a single-pass inkjet system. The printing speed is preferably 35 m/min or more, more preferably 50 m/min or more, and particularly preferably 75 m/min or more.

In the step of printing the cyan ink, the magenta ink, and the yellow ink, it is not necessary for all three color inks to be printed, and neither is it necessary for printing to be performed in the order of the cyan ink, the magenta ink, and the yellow ink. These may be selected, as appropriate, according to the desired image.

In embodiments of the present invention, the amount of ink discharged from one nozzle of an inkjet head is preferably 0.1 to 100 pL/drop, more preferably 0.5 to 75 pL/drop, and even more preferably 1 to 40 pL/drop.

In embodiments of the present invention, the nozzle density of the inkjet head is preferably 180 dpi or more, more preferably 300 dpi or more, and even more preferably 600 dpi or more.

<Semi-Curing or Semi-Drying Step>

The recording method of embodiments of the present invention preferably has a step of semi-drying or a step of semi-curing that is performed after the step of printing the cyan ink, the magenta ink, and the yellow ink included in the ink set for single-pass printing, but before the step of printing the gray ink.

In the description and the like of the present invention, "semi-curing" means partial curing, and refers to a state where the cyan ink, magenta ink, and yellow ink are partially cured but not completely cured. Specifically, following completion of semi-curing, the semi-curing can be judged by pressing plain paper against the ink and checking whether the ink has transferred. In other words, the ink having transferred is referred to as a semi-cured state. Semi-curing the inks facilitates spreading of the gray ink and enables metamerism to be effectively improved. Furthermore, mixing of colors between cyan ink, magenta ink, and yellow ink dots and gray ink dots (what is known as beading) is suppressed, and a high quality image can be obtained.

There are no particular limitations on the method for performing semi-curing, and examples thereof include publicly-known methods such as the method of radiating an active energy ray. Active energy rays may be, but are not limited to, energy beams that affect the electron orbitals of an irradiated body such as electron beams, ultraviolet rays, and infrared rays, and induce polymerization reactions such as radicals, cations, and anions. From thereamong, electron beams and ultraviolet rays are preferred, and ultraviolet rays are more preferred.

There are no particular limitations on the light source, and publicly-known light sources may be used. Specific examples include mercury lamps, xenon lamps, metal halide lamps, LEDs (light emitting diodes) such as UV-LEDs and ultraviolet laser diodes (UV-LD), and gas/solid lasers. From thereamong, UV-LEDs are preferred.

From the viewpoint of curability, the peak wavelength when UV-LEDs are used is preferably 380 to 420 nm, and more preferably 380 to 410 nm. A peak wavelength of 380 nm or more is superior in terms of safety. Furthermore, a peak wavelength of 420 nm or less is superior in terms of curability and is therefore preferable.

The amount of energy required for semi-curing varies depending on the type and content of the polymerization initiator, but 1 to 500 $mJ/cm^2$ is preferred.

In the description and the like of the present invention, "semi-drying" means partial drying, and refers to a state where the cyan ink, magenta ink, and yellow ink are partially dry but not completely dry. Semi-drying the inks facilitates spreading of the gray ink and enables metamerism to be effectively improved There are no particular limitations on the method for performing semi-drying, and examples thereof may include a heat drying method, hot-air drying method, infrared drying method, microwave drying method, and drum drying method. The drying methods above may be used alone or a plurality thereof may be used together. For example, by using both the heat drying method and hot-air drying method together, the inks can be dried more quickly than when each method is used alone.

The specific conditions for the aforementioned semi-drying vary depending on the polymerizable compound, solvent, and amount of water, but in the case of the infrared drying method for example, the semi-dry state can be achieved by drying for approximately 0.5 to 5 seconds using a carbon heater with a maximum absorption wavelength of 1500 to 2500 nm and an energy density of 20 to 200 $kw/m^2$.

<Black Ink Printing Step>

In the case where the ink set for single-pass printing of embodiments of the present invention includes a black ink, a step in which the black ink is printed (hereinafter also referred to as the "black ink printing step") may be performed before the aforementioned ink printing step, may be performed after the ink printing step but before the gray ink printing step described later, or may be performed after the gray ink printing step. From thereamong, from the viewpoint of improving metamerism, it is preferable that the black ink printing step be performed after the step of printing the gray ink.

Note that, in the case where the black ink printing step is not the final printing step, a semi-curing step or a semi-drying step may be included after the black ink printing step. Here, details of the semi-curing step and details of the semi-drying step are as described above.

<Gray Ink Printing Step>

In embodiments of the present invention, from the viewpoint of improving metamerism, printing is preferably performed using an image that is processed/produced such that the coverage rate of the gray ink is 50% or more. Note that, as an example of the image processing/producing method, an ICC profile for the ink set used in the recording method of embodiments of the present invention is created using Profile Maker developed by X-Rite, Inc. Next, using the ICC profile and Photoshop (registered trademark) developed by Adobe Inc., image data can be created that is broken down into the colors of each ink making up the ink set.

<Full-Curing or Full-Drying Step>

The recording method of embodiments of the present invention has a full-curing or full-drying step after the aforementioned steps.

In the description and the like of the present invention, "full curing" refers to a state where the inside and surface of the ink has completely cured. Specifically, following completion of full curing, the full curing can be judged by pressing plain paper against the ink and checking whether the ink has transferred. In other words, the ink having not transferred at all is referred to as a completely cured state.

The same method used for semi-curing described above can be used to perform full curing. The amount of energy required for full curing varies depending on the type and content of the polymerization initiator, but 100 to 10,000 $mJ/cm^2$ is preferred.

In the description and the like of the present invention, "full drying" refers to a state where the inside and surface of the ink has completely dried. Specifically, following completion of full drying, the full drying can be judged by pressing plain paper against the ink and checking whether the ink has transferred. In other words, the ink having not transferred at all is referred to as a completely dried state.

The same method used for semi-drying described above can be used to perform full drying.

EXAMPLES

Embodiments of the present invention are described in further detail below using examples and comparative examples. However, the present invention is not limited to these examples. In the examples and comparative examples, note that "parts" and "%" represent "parts by mass" and "% by mass" respectively.

<Production of Pigment Dispersion>

Twenty parts of LIONOL BLUE FG-7919 as a pigment, 10 parts of Solsperse 32000 as a pigment dispersant, and 70 parts of SR508 as a polymerizable compound were added and stirred using a high-speed mixer until uniform, and the mixture was then dispersed for approximately one hour using a horizontal sand mill to produce a pigment dispersion CM1.

Note that a Dyno Mill (multi-lab type, manufactured by Shinmaru Enterprises Corporation) with a volume of 0.6 L filled with 1,800 g of zirconia beads (Vickers hardness: 1,200 Hv) having a diameter of 1 mm was used as the horizontal sand mill. Furthermore, the peripheral speed of the stirring blade during dispersion was 10 m/s.

Furthermore, the pigment dispersions listed in Table 1 were produced using the same method as above with the exception of altering the raw materials used. Note that the numerical values in Table 1 represent "parts by mass" unless specifically stated otherwise, and the blank fields indicate that blending was not carried out.

TABLE 1

| | Pigment Dispersion | CM1 | CM2 | CM3 | CM4 | YM1 | YM2 | YM3 | YM4 | YM5 | YM6 | MM1 | MM2 | MM3 |
|---|---|---|---|---|---|---|---|---|---|---|---|---|---|---|
| Pigment | LIONOL BLUE FG-7919 | 20 | | | | | | | | | | | | |
| | LIONOL BLUE FG-7400G | | 20 | | 20 | | | | | | | | | |
| | LIONOL BLUE E | | | 20 | | | | | | | | | | |
| | Pigment Yellow IRC | | | | | 20 | | | | | | | | |
| | Paliotol Yellow D 1819 | | | | | | 20 | | | | | | | |
| | BAYSCRIPT YELLOW 4GF | | | | | | | 20 | | 20 | | | | |
| | Sicopal Yellow L 1100 | | | | | | | | 20 | | | | | |
| | Paliotol Yellow D 1155 | | | | | | | | | | 20 | | | |
| | FASTOGEN Super Red 7100Y | | | | | | | | | | | 20 | | |
| | Irgalite Red D 3865 | | | | | | | | | | | | 20 | |
| | FASTOGEN Super Magenta RG | | | | | | | | | | | | | 20 |
| | Pigment Pink 4602 | | | | | | | | | | | | | |
| | Cromophtal Scarlet D 3540 | | | | | | | | | | | | | |
| | Paliogen Red L 4039 | | | | | | | | | | | | | |
| | Cinquasia Magenta L 4530 | | | | | | | | | | | | | |
| | Pigment Scarlet BL | | | | | | | | | | | | | |
| | Irgazin Red L 3670 HD | | | | | | | | | | | | | |
| | Irgazin Scarlet L3550 HD | | | | | | | | | | | | | |
| | IrgazinRubine L 4020 | | | | | | | | | | | | | |
| | Cinquasia Magenta L 4400 | | | | | | | | | | | | | |
| | Hostaperm Scarlet GO | | | | | | | | | | | | | |
| | Special Black 350 | | | | | | | | | | | | | |
| Dispersant | Solsperse 32000 | 10 | 10 | 10 | | 10 | 10 | 10 | 10 | 10 | | 10 | 10 | 10 |
| | BYK-190 | | | | 10 | | | | | | 10 | | | |
| Polymerizable Compound | SR508 | 70 | 70 | 70 | | 70 | 70 | 70 | 70 | 70 | | 70 | 70 | 70 |
| | Water | | | | 70 | | | | | | 70 | | | |
| | Total Amount | 100 | 100 | 100 | 100 | 100 | 100 | 100 | 100 | 100 | 100 | 100 | 100 | 100 |

TABLE 1-continued

| Pigment Dispersion | | MM4 | MM5 | MM6 | MM7 | MM8 | MM9 | MM10 | MM11 | MM12 | MM13 | MM14 | BM1 | BM2 |
|---|---|---|---|---|---|---|---|---|---|---|---|---|---|---|
| Pigment | LIONOL BLUE FG-7919 | | | | | | | | | | | | | |
| | LIONOL BLUE FG-7400G | | | | | | | | | | | | | |
| | LIONOL BLUE E Pigment | | | | | | | | | | | | | |
| | Yellow IRC | | | | | | | | | | | | | |
| | Paliotol Yellow D 1819 | | | | | | | | | | | | | |
| | BAYSCRIPT YELLOW 4GF | | | | | | | | | | | | | |
| | Sicopal Yellow L 1100 | | | | | | | | | | | | | |
| | Paliotol Yellow D 1155 | | | | | | | | | | | | | |
| | FASTOGEN Super Red 7100Y | | | | | | | | | | | | | |
| | Irgalite Red D 3865 | | | | | | | | | | | | | |
| | FASTOGEN Super Magenta RG | | | | | | | | | | | | | |
| | Pigment Pink 4602 | 20 | | | | | | | | | | | | |
| | Cromophtal Scarlet D 3540 | | 20 | | | | | | | | | | | |
| | Paliogen Red L 4039 | | | 20 | | | | | | | | | | |
| | Cinquasia Magenta L 4530 | | | | 20 | | | | | | | | | |
| | Pigment Scarlet BL | | | | | 20 | | | | | | | | |
| | Irgazin Red L 3670 HD | | | | | | 20 | | | | 20 | | | |
| | Irgazin Scarlet L3550 HD | | | | | | | 20 | | | | | | |
| | IrgazinRubine L 4020 | | | | | | | | 20 | | | | | |
| | Cinquasia Magenta L 4400 | | | | | | | | | 20 | | | | |
| | Hostaperm Scarlet GO | | | | | | | | | | | 20 | | |
| | Special Black 350 | | | | | | | | | | | | 20 | 20 |
| Dispersant | Solsperse 32000 | 10 | 10 | 10 | 10 | 10 | 10 | 10 | 10 | 10 | 10 | | 10 | |
| | BYK-190 | | | | | | | | | | | 10 | | 10 |
| Polymerizable Compound | SR508 | 70 | 70 | 70 | 70 | 70 | 70 | 70 | 70 | 70 | 70 | | 70 | |
| | Water | | | | | | | | | | | 70 | | 70 |
| | Total Amount | 100 | 100 | 100 | 100 | 100 | 100 | 100 | 100 | 100 | 100 | 100 | 100 | 100 |

Furthermore, with the exception of using zirconia beads (Vickers hardness of 1,200 Hv) having a diameter of 1.5 mm, alumina beads (Vickers hardness of 1,500 Hv) having a diameter of 1 mm, or alumina-zirconia beads (Vickers hardness of 1,000 Hv) having a diameter of 1 mm as media to fill the horizontal sand mill, pigment dispersion MM9-1, pigment dispersion MM9-2, and pigment dispersion MM9-3 were each produced using the same method as that described for pigment dispersion MM9.

<Production of Inks>

Amounts of 17.5 parts of pigment dispersion CM1, 27.4 parts of SR508, 35 parts of VEEA, and 10 parts of SR454 as polymerizable compounds, 6 parts of Omnirad TPO, 2 parts of Omnirad 379, and 2 parts of Omnirad ITX as polymerization initiators, and 0.1 parts of BYK-3510 as a surface tension modifier were added and stirred for 2 hours with a high-speed mixer. Thereafter, it was confirmed that no solid components remained to be dissolved, and the mixture was filtered through a membrane filter having a pore diameter of 1 μm to produce cyan ink C1.

Furthermore, the inks listed in Table 2 were produced using the same method as above with the exception of altering the raw materials used. Note that the numerical values in Table 2 represent "parts by mass" unless specifically stated otherwise, and the blank fields indicate that blending was not carried out.

TABLE 2

| | Ink | C1 | C2 | C3 | C4 | C5 | C6 | C7 | C8 | C9 | C10 | C11 |
|---|---|---|---|---|---|---|---|---|---|---|---|---|
| Pigment Dispersion | Pigment Dispersion CM1 | 17.5 | | | | | | | | | | |
| | Pigment Dispersion CM2 | | 17.5 | 17.5 | | | 17.5 | 17.5 | 17.5 | 17.5 | 17.5 | 17.5 |
| | Pigment Dispersion CM3 | | | | 17.5 | | | | | | | |
| | Pigment Dispersion CM4 | | | | | 17.5 | | | | | | |
| | Pigment Dispersion YM1 | | | | | | | | | | | |
| | Pigment Dispersion YM2 | | | | | | | | | | | |
| | Pigment Dispersion YM3 | | | | | | | | | | | |
| | Pigment Dispersion YM4 | | | | | | | | | | | |
| | Pigment Dispersion YM5 | | | | | | | | | | | |
| | Pigment Dispersion YM6 | | | | | | | | | | | |
| Polymerizable Compound | SR508 | 27.4 | 27.4 | 27.9 | 27.4 | | 17.4 | 7.4 | 2.4 | 27.4 | 27.4 | 27.4 |
| | VEEA | 35 | 35 | 35 | 35 | | 25 | 15 | | 25 | 20 | 15 |
| | SR454 | 10 | 10 | 10 | 10 | | 10 | 10 | 10 | 10 | 10 | 10 |
| | SR339A | | | | | | 10 | 20 | 30 | | | |
| | SR335 | | | | | | 10 | 20 | 30 | | | |
| | NVC | | | | | | | | | 10 | 15 | 20 |
| Polymerization Initiator | Omnirad TPO | 6 | 6 | 7.5 | 6 | | 6 | 6 | 6 | 6 | 6 | 6 |
| | Ominrad 379 | 2 | 2 | 1 | 2 | | 2 | 2 | 2 | 2 | 2 | 2 |
| | Ominrad ITX | 2 | 2 | 1 | 2 | | 2 | 2 | 2 | 2 | 2 | 2 |
| Surface Tension Modifier | BYK-UV3510 | 0.1 | 0.1 | 0.1 | 0.1 | | 0.1 | 0.1 | 0.1 | 0.1 | 0.1 | 0.1 |
| | BYK-333 | | | | | 0.1 | | | | | | |
| Resin | JONCRYL819 | | | | | 10 | | | | | | |
| Organic Solvent | 1.2PG | | | | | 30 | | | | | | |
| | Water | | | | | 42.4 | | | | | | |
| | Total Amount | 100 | 100 | 100 | 100 | 100 | 100 | 100 | 100 | 100 | 100 | 100 |
| Evaluation Results | Static Surface Tension | 23.2 | 23.4 | 23.4 | 22.9 | 23.3 | 23.2 | 23.2 | 23.1 | 23.4 | 23 | 23.4 |
| | Hue Angle H° | 207 | 247 | 251 | 278 | 249 | 250 | 251 | 251 | 249 | 245 | 240 |
| | Light Resistance | 5 | 5 | 5 | 5 | 5 | 5 | 5 | 5 | 5 | 5 | 5 |

| | Ink | Y1 | Y2 | Y3 | Y4 | Y5 | Y6 | Y7 | Y8 | Y9 | Y10 | Y11 | Y12 | Y13 |
|---|---|---|---|---|---|---|---|---|---|---|---|---|---|---|
| Pigment Dispersion | Pigment Dispersion CM1 | | | | | | | | | | | | | |
| | Pigment Dispersion CM2 | | | | | | | | | | | | | |
| | Pigment Dispersion CM3 | | | | | | | | | | | | | |
| | Pigment Dispersion CM4 | | | | | | | | | | | | | |
| | Pigment Dispersion YM1 | 20 | | | | | | | | | | | | |
| | Pigment Dispersion YM2 | | 20 | | | | | | | | | | | |
| | Pigment Dispersion YM3 | | | 20 | 20 | | | | 20 | 20 | 20 | 20 | 20 | 20 |
| | Pigment Dispersion YM4 | | | | | 20 | | | | | | | | |
| | Pigment Dispersion YM5 | | | | | | 20 | | | | | | | |
| | Pigment Dispersion YM6 | | | | | | | 20 | | | | | | |
| Polymerizable Compound | SR508 | 24.9 | 24.9 | 24.9 | 25.4 | 24.9 | 24.9 | | 14.9 | 4.9 | | 24.9 | 24.9 | 24.9 |
| | VEEA | 35 | 35 | 35 | 35 | 35 | 35 | | 25 | 15 | 9.9 | 25 | 20 | 15 |
| | SR454 | 10 | 10 | 10 | 10 | 10 | 10 | | 10 | 10 | 9.9 | 10 | 10 | 10 |
| | SR339A | | | | | | | | 10 | 20 | 30 | | | |
| | SR335 | | | | | | | | 10 | 20 | 30 | | | |
| | NVC | | | | | | | | | | | 10 | 15 | 20 |
| Polymerization Initiator | Omnirad TPO | 6 | 6 | 6 | 7.5 | 6 | 6 | | 6 | 6 | 6 | 6 | 6 | 6 |
| | Ominrad 379 | 2 | 2 | 2 | 1 | 2 | 2 | | 2 | 2 | 2 | 2 | 2 | 2 |
| | Ominrad ITX | 2 | 2 | 2 | 1 | 2 | 2 | | 2 | 2 | 2 | 2 | 2 | 2 |
| Surface Tension Modifier | BYK-UV3510 | 0.1 | 0.1 | 0.1 | 0.1 | 0.1 | 0.1 | | 0.1 | 0.1 | 0.1 | 0.1 | 0.1 | 0.1 |
| | BYK-333 | | | | | | | 0.1 | | | | | | |

TABLE 2-continued

| | | | | | | | | | | | | | | | |
|---|---|---|---|---|---|---|---|---|---|---|---|---|---|---|---|
| Resin | JONCRYL819 | | | | | | 10 | | | | | | | | |
| Organic Solvent | 1.2PG | | | | | | 30 | | | | | | | | |
| | Water | | | | | | 39.9 | | | | | | | | |
| Evaluation Results | Total Amount | 100 | 100 | 100 | 100 | 100 | 100 | 100 | 100 | 100 | 100 | 100 | 100 | 100 | |
| | Static Surface Tension | 23.3 | 23.2 | 23.1 | 23.1 | 22.9 | 22.8 | 24.1 | 23.1 | 23.1 | 23.1 | 23.1 | 23.1 | 23.1 | |
| | Hue Angle H° | 71 | 83 | 93 | 91 | 99 | 94 | 95 | 92 | 93 | 93 | 91 | 91 | 90 | |
| | Light Resistance | 3 | 4 | 5 | 5 | 4 | 4 | 5 | 5 | 5 | 5 | 5 | 5 | 5 | |

| | Ink | M1 | M2 | M3 | M4 | M5 | M6 | M7 | M8 | M9 | M10 | M11 | M12 | M13 | M14 | M15 |
|---|---|---|---|---|---|---|---|---|---|---|---|---|---|---|---|---|
| Pigment Dispersion | Pigment Dispersion MM1 | 25 | | | | | | | | | | | | | | |
| | Pigment Dispersion MM2 | | 25 | | | | | | | | | | | | | |
| | Pigment Dispersion MM3 | | | 25 | | | | | | | | | | | | 12.5 |
| | Pigment Dispersion MM4 | | | | 25 | | | | | | | | | | | |
| | Pigment Dispersion MM5 | | | | | 25 | | | | | | | | | | |
| | Pigment Dispersion MM6 | | | | | | 25 | | | | | | | | | |
| | Pigment Dispersion MM7 | | | | | | | 25 | | | | | | | | |
| | Pigment Dispersion MM8 | | | | | | | | 25 | | | | | | | |
| | Pigment Dispersion MM9 | | | | | | | | | 25 | 25 | | | | | 12.5 |
| | Pigment Dispersion MM9-1 | | | | | | | | | | | | | | | |
| | Pigment Dispersion MM9-2 | | | | | | | | | | | | | | | |
| | Pigment Dispersion MM9-3 | | | | | | | | | | | 25 | | | | |
| | Pigment Dispersion MM10 | | | | | | | | | | | | 25 | | | |
| | Pigment Dispersion MM11 | | | | | | | | | | | | | 25 | | |
| | Pigment Dispersion MM12 | | | | | | | | | | | | | | 25 | |
| | Pigment Dispersion MM13 | | | | | | | | | | | | | | | |
| | Pigment Dispersion MM14 | | | | | | | | | | | | | | | |
| Polymerizable Compound | SR508 | 19.9 | 19.9 | 19.9 | 19.9 | 19.9 | 19.9 | 19.9 | 19.9 | 19.9 | 20.4 | 19.9 | 19.9 | 19.9 | 19.9 | 19.9 |
| | VEEA | 35 | 35 | 35 | 35 | 35 | 35 | 35 | 35 | 35 | 35 | 35 | 35 | 35 | 35 | 35 |
| | SR454 | 10 | 10 | 10 | 10 | 10 | 10 | 10 | 10 | 10 | 10 | 10 | 10 | 10 | 10 | 10 |
| | SR339A | | | | | | | | | | | | | | | |
| | SR335 | | | | | | | | | | | | | | | |
| | NVC | | | | | | | | | | | | | | | |
| Polymerization Initiator | Omnirad TPO | 6 | 6 | 6 | 6 | 6 | 6 | 6 | 6 | 6 | 7.5 | 6 | 6 | 6 | 6 | 6 |
| | Omnirad 379 | 2 | 2 | 2 | 2 | 2 | 2 | 2 | 2 | 2 | 1 | 2 | 2 | 2 | 2 | 2 |
| | Ominrad ITX | 2 | 2 | 2 | 2 | 2 | 2 | 2 | 2 | 2 | 1 | 2 | 2 | 2 | 2 | 2 |
| Surface Tension Modifier | BYK-UV3510 | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| | BYK-333 | | | | | | | | | | | | | | | |
| Resin | JONCRYL819 | | | | | | | | | | | | | | | |
| Organic Solvent | 1.2PG | | | | | | | | | | | | | | | |
| | Water | | | | | | | | | | | | | | | |
| Evaluation Results | Total Amount | 100 | 100 | 100 | 100 | 100 | 100 | 100 | 100 | 100 | 100 | 100 | 100 | 100 | 100 | 100 |
| | Static Surface Tension | 23.2 | 23.1 | 23.4 | 23.1 | 23 | 23.3 | 22.9 | 23.1 | 23.1 | 23.3 | 23.2 | 23.3 | 23.5 | 23.4 | 23.2 |
| | Hue Angle H° | 4 | 41 | 328 | 32 | 37 | 35 | 16 | 38 | 36 | 36 | 39 | 32 | 21 | 38 | 13 |
| | Light Resistance | 4 | 4 | 4 | 4 | 5 | 4 | 4 | 3 | 5 | 5 | 5 | 5 | 4 | 5 | 5 |

| | Ink | M16 | M17 | M18 | M19 | M20 | M21 | M22 | M23 | M24 | M25 | M26 | M27 | M28 | M29 | M30 |
|---|---|---|---|---|---|---|---|---|---|---|---|---|---|---|---|---|
| Pigment Dispersion | Pigment Dispersion MM1 | 12.5 | | 12.5 | | | | | | | | | | | | |
| | Pigment Dispersion MM2 | | | | | | | | | | | | | | | |
| | Pigment Dispersion MM3 | | 12.5 | | 12.5 | | | | | | | | | | | |

TABLE 2-continued

| | | | | | | | | | | | | | | | |
|---|---|---|---|---|---|---|---|---|---|---|---|---|---|---|---|
| | Pigment Dispersion MM4 | | 12.5 | 12.5 | | | | | | | | | | | |
| | Pigment Dispersion MM5 | | | | 12.5 | 12.5 | | | | | | | | | |
| | Pigment Dispersion MM6 | | | | | | | | | | | | | | |
| | Pigment Dispersion MM7 | | | | | | | | | | | | | | |
| | Pigment Dispersion MM8 | | | | | | | | | | | | | | |
| | Pigment Dispersion MM9 | 12.5 | | | | | 25 | 25 | 25 | 25 | 25 | 25 | | | |
| | Pigment Dispersion MM9-1 | | | | | | | | | | | | 25 | | |
| | Pigment Dispersion MM9-2 | | | | | | | | | | | | | 25 | |
| | Pigment Dispersion MM9-3 | | | | | | | | | | | | | | 25 |
| | Pigment Dispersion MM10 | | | | | | | | | | | | | | |
| | Pigment Dispersion MM11 | | | | | | | | | | | | | | |
| | Pigment Dispersion MM12 | | | | | | | | | | | | | | |
| | Pigment Dispersion MM13 | | | | | | | | | | | | | | |
| | Pigment Dispersion MM14 | | | | | 25 | | | | | | | | | |
| Polymerizable Compound | SR508 | 19.9 | 19.9 | 19.9 | 19.9 | 19.9 | | 9.9 | | | 19.9 | 19.9 | 19.9 | 19.9 | 19.9 | 19.9 |
| | VEEA | 35 | 35 | 35 | 35 | 35 | | 25 | 14.9 | | 25 | 20 | 15 | 35 | 35 | 35 |
| | SR454 | 10 | 10 | 10 | 10 | 10 | | 10 | 10 | 4.9 | 10 | 10 | 10 | 10 | 10 | 10 |
| | SR339A | | | | | | | 10 | 20 | 30 | | | | | | |
| | SR335 | | | | | | | 10 | 20 | 30 | | | | | | |
| | NVC | | | | | | | | | | 10 | 15 | 20 | | | |
| Polymerization Initiator | Omnirad TPO | 6 | 6 | 6 | 6 | 6 | | 6 | 6 | 6 | 6 | 6 | 6 | 6 | 6 | 6 |
| | Omnirad 379 | 2 | 2 | 2 | 2 | 2 | | 2 | 2 | 2 | 2 | 2 | 2 | 2 | 2 | 2 |
| | Ominrad ITX | 2 | 2 | 2 | 2 | 2 | | 2 | 2 | 2 | 2 | 2 | 2 | 2 | 2 | 2 |
| Surface Tension Modifier | BYK-UV3510 | 0.1 | 0.1 | 0.1 | 0.1 | 0.1 | | 0.1 | 0.1 | 0.1 | 0.1 | 0.1 | 0.1 | 0.1 | 0.1 | 0.1 |
| | BYK-333 | | | | | | 0.1 | | | | | | | | | |
| Resin | JONCRYL819 | | | | | | 10 | | | | | | | | | |
| Organic Solvent | 1.2PG | | | | | | 30 | | | | | | | | | |
| | Water | | | | | | 34.9 | | | | | | | | | |
| | Total Amount | 100 | 100 | 100 | 100 | 100 | 100 | 100 | 100 | 100 | 100 | 100 | 100 | 100 | 100 | 100 |
| Evaluation Results | Static Surface Tension | 23 | 23.2 | 23.5 | 23.3 | 23.1 | 23.8 | 23.1 | 23.1 | 23.1 | 23.1 | 23.1 | 23.1 | 23.1 | 23.1 | 23.1 |
| | Hue Angle H° | 21 | 11 | 19 | 14 | 23 | 34 | 35 | 36 | 36 | 36 | 37 | 38 | 37 | 36 | 37 |
| | Light Resistance | 5 | 4 | 4 | 5 | 5 | 5 | 5 | 5 | 5 | 5 | 5 | 5 | 5 | 5 | 5 |

| | Ink | Gr1 | Gr2 | Gr3 | Gr4 | Gr5 | Gr6 | Gr7 | Gr8 | Gr9 | Gr10 | Gr11 | Gr12 | Gr13 | Gr14 |
|---|---|---|---|---|---|---|---|---|---|---|---|---|---|---|---|
| Pigment Dispersion | Pigment Dispersion CM1 | | | | | | | | | | | | | 1.5 | |
| | Pigment Dispersion YM5 | | | | | | | | | | | | | 1.75 | 1.75 |
| | Pigment Dispersion MM3 | | | | | | | | | | | | | 2 | |
| | Pigment Dispersion BM1 | 2.5 | 2.5 | 2.5 | 2.5 | 2.5 | 2.5 | 2.5 | 0.625 | 1.25 | 3.75 | 5 | 6.25 | 1.25 | 1.25 |
| | Pigment Dispersion BM2 | | | | | | | | | | | | | | |
| Polymerizable Compound | SR508 | 42 | 42.9 | 42 | 42 | 42 | 41.5 | 41.5 | 43.875 | 43.25 | 40.75 | 39.5 | 38.25 | 38 | 41.5 |
| | VEEA | 35 | 35 | 35 | 35 | 35 | 35 | 35 | 35 | 35 | 35 | 35 | 35 | 35 | 35 |
| | SR454 | 10 | 10 | 10 | 10 | 10 | 10 | 10 | 10 | 10 | 10 | 10 | 10 | 10 | 10 |
| | SR339A | | | | | | | | | | | | | | |
| | SR335 | | | | | | | | | | | | | | |
| | NVC | | | | | | | | | | | | | | |
| Polymerization Initiator | Omnirad TPO | 7.5 | 7.5 | 7.5 | 7.5 | 9.5 | 7.5 | 6 | 7.5 | 7.5 | 7.5 | 7.5 | 7.5 | 7.5 | 7.5 |
| | Omnirad 379 | 1 | 1 | 2 | | 1.5 | 2 | 1 | 1 | 1 | 1 | 1 | 1 | 1 | 1 |
| | Ominrad ITX | 1 | 1 | | 2 | 1 | 2 | 1 | 1 | 1 | 1 | 1 | 1 | 1 | 1 |
| | Omnirad 819 | | | | | | | | | | | | | | |
| | Omnirad 369 | | | | | | | | | | | | | | |
| | Speedcure DETX | | | | | | | | | | | | | | |

TABLE 2-continued

| | | | | | | | | | | | | | | | |
|---|---|---|---|---|---|---|---|---|---|---|---|---|---|---|---|
| Surface Tension Modifier | BYK-UV3510 | 1 | 0.1 | 1 | 1 | 1 | 1 | 1 | 1 | 1 | 1 | 1 | 1 | 1 | 1 |
| | BYK-333 | | | | | | | | | | | | | | |
| Resin | JONCRYL819 | | | | | | | | | | | | | | |
| Organic Solvent | 1.2PG | | | | | | | | | | | | | | |
| | Water | | | | | | | | | | | | | | |
| | Total Amount | 100 | 100 | 100 | 100 | 100 | 100 | 100 | 100 | 100 | 100 | 100 | 100 | 100 | 100 |
| Evaluation Results | Static Surface Tension | 21.5 | 23.3 | 21.2 | 21.5 | 21.1 | 21.2 | 21.1 | 21.1 | 21.2 | 21.5 | 21.5 | 21.4 | 21.5 | 21.6 |
| | Hue Angle H° | | | | | | | | | | | | | | |
| | Light Resistance | 5 | 5 | 5 | 5 | 5 | 5 | 5 | 5 | 5 | 5 | 5 | 5 | 4 | 4 |

| | Ink | Gr15 | Gr16 | Gr17 | Gr18 | Gr19 | Gr20 | Gr21 | Gr22 | Gr23 | Gr24 | Gr25 | Gr26 | Gr27 |
|---|---|---|---|---|---|---|---|---|---|---|---|---|---|---|
| Pigment Dispersion | Pigment Dispersion CM1 | | | | | | | | | | | | | |
| | Pigment Dispersion YM5 | | | | | | | | | | | | | |
| | Pigment Dispersion MM3 | | | | | | | | | | | | | |
| | Pigment Dispersion BM1 | | 2.5 | 2.5 | 2.5 | 2.5 | 2.5 | 2.5 | 2.5 | 2.5 | 2.5 | 2.5 | 2.5 | 2.5 |
| | Pigment Dispersion BM2 | 2.5 | | | | | | | | | | | | |
| Polymerizable Compound | SR508 | | 42 | 42 | 42 | 42 | 41.5 | 41.5 | 32 | 22 | 12 | 42 | 42 | 42 |
| | VEEA | | 35 | 35 | 35 | 35 | 35 | 35 | 25 | 15 | 5 | 25 | 20 | 15 |
| | SR454 | | 10 | 10 | 10 | 10 | 10 | 10 | 10 | 10 | 10 | 10 | 10 | 10 |
| | SR339A | | | | | | | | 10 | 20 | 30 | | | |
| | SR335 | | | | | | | | 10 | 20 | 30 | | | |
| | NVC | | | | | | | | | | | 10 | 15 | 20 |
| Polymerization Initiator | Omnirad TPO | | | 7.5 | 7.5 | 7.5 | 7.5 | 6 | 7.5 | 7.5 | 7.5 | 7.5 | 7.5 | 7.5 |
| | Omnirad 379 | | 1 | | | | | | 1 | 1 | 1 | 1 | 1 | 1 |
| | Omnirad ITX | | 1 | | | | | | 1 | 1 | 1 | 1 | 1 | 1 |
| | Omnirad 819 | | 7.5 | | | | | | | | | | | |
| | Omnirad 369 | | | 1 | | 2 | | 1.5 | 2 | | | | | |
| | Speedcure DETX | | | 1 | | 2 | 1 | 2 | | | | | | |
| Surface Tension Modifier | BYK-UV3510 | | 1 | 1 | 1 | 1 | 1 | 1 | 1 | 1 | 1 | 1 | 1 | 1 |
| | BYK-333 | 1 | | | | | | | | | | | | |
| Resin | JONCRYL819 | 10 | | | | | | | | | | | | |
| Organic Solvent | 1.2PG | 30 | | | | | | | | | | | | |
| | Water | 56.5 | | | | | | | | | | | | |
| | Total Amount | 100 | 100 | 100 | 100 | 100 | 100 | 100 | 100 | 100 | 100 | 100 | 100 | 100 |
| Evaluation Results | Static Surface Tension | 22.3 | 21.5 | 21.5 | 21.2 | 21.5 | 21.2 | 21.1 | 21.5 | 21.5 | 21.5 | 21.5 | 21.5 | 21.5 |
| | Hue Angle H° | | | | | | | | | | | | | |
| | Light Resistance | 5 | 5 | 5 | 5 | 5 | 5 | 5 | 5 | 5 | 5 | 5 | 5 | 5 |

| | Ink | K1 | K2 | K3 | K4 | K5 | K6 | K7 | K8 |
|---|---|---|---|---|---|---|---|---|---|
| Pigment Dispersion | Pigment Dispersion BM1 | 12.5 | | 12.5 | 12.5 | 12.5 | 12.5 | 12.5 | 12.5 |
| | Pigment Dispersion BM2 | | 12.5 | | | | | | |
| Polymerizable Compound | SR508 | 32.4 | | 22.4 | 12.4 | 2.4 | 32.4 | 32.4 | 32.4 |
| | VEEA | 35 | | 25 | 15 | 5 | 25 | 20 | 15 |
| | SR454 | 10 | | 10 | 10 | 10 | 10 | 10 | 10 |
| | SR339A | | | 10 | 20 | 30 | | | |
| | SR335 | | | 10 | 20 | 30 | | | |
| | NVC | | | | | | 10 | 15 | 20 |
| Polymerization Initiator | Omnirad TPO | 6 | | 6 | 6 | 6 | 6 | 6 | 6 |
| | Omnirad 379 | 2 | | 2 | 2 | 2 | 2 | 2 | 2 |
| | Omnirad ITX | 2 | | 2 | 2 | 2 | 2 | 2 | 2 |
| Surface Tension Modifier | BYK-UV3510 | 0.1 | | 0.1 | 0.1 | 0.1 | 0.1 | 0.1 | 0.1 |
| | BYK-333 | | 0.1 | | | | | | |
| Resin | JONCRYL819 | | 10 | | | | | | |
| Organic Solvent | 1.2PG | | 30 | | | | | | |
| | Water | | 47.4 | | | | | | |
| | Total Amount | 100 | 100 | 100 | 100 | 100 | 100 | 100 | 100 |

TABLE 2-continued

| Evaluation Results | Static Surface Tension | 23.2 | 23.9 | 23.2 | 23.4 | 23.3 | 23.5 | 23.1 | 23 |
|---|---|---|---|---|---|---|---|---|---|
| | Hue Angle H° Light Resistance | 5 | 5 | 5 | 5 | 5 | 5 | 5 | 5 |

Details of the components listed in Tables 1 and 2 and described above are as follows.

LIONOL BLUE FG-7919: C.I. Pigment Blue 15:3, manufactured by TOYOCOLOR Co., Ltd.

LIONOL BLUE FG-7400G: C.I. Pigment Blue 15:4, manufactured by TOYOCOLOR Co., Ltd.

LIONOL BLUE E: C.I. Pigment Blue 15:6, manufactured by TOYOCOLOR Co., Ltd.

Pigment Yellow IRC: C.I. Pigment Yellow 83, Sanyo Color Works, Ltd.

Paliotol Yellow D 1819: C.I. Pigment Yellow 139, manufactured by BASF Corporation BAYSCRIPT Yellow 4GF: C.I. Pigment Yellow 150, manufactured by Lanxess AG Sicopal Yellow L 1100: C.I. Pigment Yellow 184, manufactured by BASF Corporation Paliotol Yellow D 1155: C.I. Pigment Yellow 185, manufactured by BASF Corporation FASTOGEN Super Red 7100Y: C.I. Pigment Violet 19, manufactured by DIC Corporation Irgalite Red D 3865: C.I. Pigment Yellow 112, manufactured by BASF Corporation FASTOGEN Super Magenta RG: C.I. Pigment Red 122, manufactured by DIC Corporation Pigment Pink 4602: C.I. Pigment Red 146, Sanyo Color Works, Ltd.

Cromophtal Scarlet D 3540: C.I. Pigment Red 166, manufactured by BASF Corporation Paliogen Red L 4039: C.I. Pigment Red 177, manufactured by BASF Corporation Cinquasia Magenta L 4530: C.I. Pigment Red 202, manufactured by BASF Corporation Pigment Scarlet BL: C.I. Pigment Red 237, Sanyo Color Works, Ltd.

Irgazin Red L 3670: C.I. Pigment Red 254, manufactured by BASF Corporation

Irgazin Scarlet L3550 HD: C.I. Pigment Red 255, manufactured by BASF Corporation IrgazinRubine L 4020: C.I. Pigment Red 264, manufactured by BASF Corporation Cinquasia Magenta L 4400: C.I. Pigment Red 282, manufactured by BASF Corporation Hostaperm Scarlet GO: C.I. Pigment Red 168, manufactured by Clariant AG Special Black 350: C.I. Pigment Black 7, manufactured by Evonik Degussa GmbH Solsperse 32000: Resin pigment dispersant, manufactured by The Lubrizol Corporation BYK-190: Resin pigment dispersant, manufactured by BYK-Chemie GmbH SR508: Dipropylene glycol diacrylate, manufactured by Arkema S.A.

VEEA: Acrylic acid 2-(2-vinyloxyethoxy) ethyl, manufactured by Nippon Shokubai Co., Ltd.

SR454: Ethoxylated (3) trimethylolpropane triacrylate, manufactured by Arkema s.A.

SR339A: Phenoxyethyl acrylate, manufactured by Arkema S.A.

SR335: Lauryl acrylate, manufactured by Arkema S.A.

NVC: N-vinylcaprolactam, manufactured by BASF Corporation

Omnirad TPO: 2,4,6-trimethylbenzoyl-diphenylphosphine oxide, manufactured by iGM Resins B.V.

Omnirad 379: 2-(dimethylamino)-2-[(4-methylphenyl)methyl]-1-[4-(4-morpholinyl)phenyl]-1-1-butanone, manufactured by iGM Resins B.V.

Omnirad ITX: 2-isopropylthioxanthone, manufactured by iGM Resins B.V.

Omnirad 819: bis(2,4,6-trimethylbenzoyl)-phenylphosphine oxide, manufactured by iGM Resins B.V.

Omnirad 369: 2-benzyl-2-dimethylamino-1-(4-morpholinophenyl)-butanone-1, manufactured by iGM Resins B.V.

Speedcure DETX: 2,4-diethylthioxanthone, manufactured by Sartomer

BYK-UV3510: Polyether-modified polydimethylsiloxane, manufactured by BYK-Chemie GmbH BYK-333: Polyether-modified polydimethylsiloxane, manufactured by BYK-Chemie GmbH JONCRYL819: Acrylic resin, manufactured by BASF Corporation 1,2PG: 1,2-propylene glycol manufactured by ADEKA Corporation <Evaluation of Inks>

Using a OnePass JET manufactured by Tritek Co., Ltd. equipped with an inkjet head (resolution 600 dpi×600 dpi) manufactured by Kyocera Corporation with the produced inks loaded therein, for each ink a solid image having a dot area percent of 100% (equivalent to a film thickness of 8 μm) was printed on OK Topcoat+ manufactured by Oji Paper Co., Ltd. Note that an ink droplet amount of 14 pL and a printing speed of 50 m/min were set as conditions.

After printing, except for C5, Y7, M21, Gr15, and K2, a 160-W/cm metal halide lamp (365 nm) manufactured by Harison Toshiba Lighting Corporation was used to cure the solid images and obtain solid printed items. Furthermore, for the aqueous inks C5, Y7, M21, Gr15, and K2, after printing under the above conditions, the inks were dried for 3 minutes using a 70° C. air oven to obtain solid printed items.

<Measurement of Ink Static Surface Tension>

The static surface tension at 25° C. of the prepared inks was measured using a DY-300 manufactured by Kyowa Interface Science Co., Ltd.

<Measurement of Hue Angle H°>

For the solid printed items produced using the method described above, the hue angles H° were measured using the X-Rite 500 Series manufactured by X-Rite, Inc. However, the hue angle H° was not measured for the gray ink.

<Evaluation of Light Resistance>

The solid printed items produced using the method described above were exposed for 400 hours under the conditions of a black panel at 63° C. and an irradiation amount of 70,000 Lux using a Xenon Weather Meter XL75 manufactured by Suga Test Instruments Co., Ltd. After exposure, OD values of the solid printed items were measured under the conditions of a 2° viewing angle, illuminant D65, and filter T using the X-Rite 500 Series manufactured by X-Rite, Inc. Then, based on the OD values of the solid printed items before exposure, the rate of decrease in the OD values of the solid printed items after exposure was determined, and light resistance was evaluated based on the evaluation criteria below. Note that 3 or above in the evaluation criteria below was taken as the level at which practical application presents no problems.

5: Rate of decrease in OD value <10%
4: 10% rate of decrease in OD value <15%
3: 15% rate of decrease in OD value <20%
2: 20% rate of decrease in OD value <30%
1: Rate of decrease in OD value >30%

<Measurement of Spectral Reflectance>

The spectral reflectances at wavelengths of 420 nm, 500 nm, 570 nm, and 700 nm of magenta ink and gray ink solid printed items produced using the method described above were measured with a 2° viewing angle, illuminant D65, and CIE color system using the X-Rite 500 Series manufactured by X-Rite, Inc. However, measurement of the spectral reflectance at the wavelength of 700 nm was performed only for the magenta ink.

The evaluation results for the hue angle H°, static surface tension, and light resistance were as shown in Table 2, and the evaluation results for the spectral reflectance were as shown in Tables 3 and 4.

TABLE 3

| Ink | | M1 | M2 | M3 | M4 | M5 | M6 | M7 | M8 | M9 | M10 | M11 | M12 | M13 | M14 | M15 |
|---|---|---|---|---|---|---|---|---|---|---|---|---|---|---|---|---|
| Spectral Reflectance | 420 nm | 31 | 0.8 | 40.2 | 0.8 | 1.1 | 0.5 | 1.1 | 1.6 | 0.6 | 0.6 | 1.4 | 1 | 2.9 | 10.5 | 4.7 |
| | 500 nm | 6.7 | 0.8 | 10.7 | 0.6 | 2.4 | 0.6 | 1 | 1 | 0.7 | 0.7 | 1.7 | 1.2 | 1.5 | 2.8 | 2.8 |
| | 570 nm | 5 | 2.9 | 3.9 | 1.2 | 2.8 | 1.2 | 4.2 | 4.2 | 1.5 | 1.5 | 4.8 | 8.5 | 1.6 | 22.5 | 2.5 |
| | 700 nm | 89 | 81 | 87.9 | 70.3 | 65.9 | 75.9 | 87.9 | 84.9 | 86.1 | 86.1 | 79.8 | 67.7 | 57.5 | 87.7 | 87 |
| | 420 nm/700 nm | 34.8 | 1.0 | 45.7 | 1.1 | 1.7 | 0.7 | 1.3 | 1.9 | 0.7 | 0.7 | 1.8 | 1.5 | 5.0 | 12.0 | 5.4 |
| | 500 nm/700 nm | 7.5 | 1.0 | 12.2 | 0.9 | 3.6 | 0.8 | 1.1 | 1.2 | 0.8 | 0.8 | 2.1 | 1.8 | 2.6 | 3.2 | 3.2 |
| | 570 nm/700 nm | 5.6 | 3.6 | 4.4 | 1.7 | 4.2 | 1.6 | 4.8 | 4.9 | 1.7 | 1.7 | 6.0 | 12.6 | 2.8 | 25.7 | 2.9 |

| Ink | | M16 | M17 | M18 | M19 | M20 | M21 | M22 | M23 | M24 | M25 | M26 | M27 | M28 | M29 | M30 |
|---|---|---|---|---|---|---|---|---|---|---|---|---|---|---|---|---|
| Spectral Reflectance | 420 nm | 4.3 | 5.6 | 5 | 6.3 | 5.8 | 0.9 | 0.6 | 0.7 | 0.6 | 0.6 | 0.7 | 0.5 | 0.7 | 0.5 | 0.7 |
| | 500 nm | 2.22 | 2.3 | 2 | 5 | 4 | 0.9 | 0.8 | 0.7 | 0.6 | 0.7 | 0.8 | 0.8 | 0.9 | 0.7 | 1.1 |
| | 570 nm | 2.8 | 2.1 | 2.4 | 2.8 | 3.8 | 2 | 1.5 | 1.8 | 1.7 | 1.4 | 1.7 | 1.5 | 2 | 1.4 | 2.1 |
| | 700 nm | 86.9 | 78.6 | 78.5 | 70.3 | 76 | 88 | 86.1 | 86.1 | 86.1 | 86.1 | 86.1 | 86.1 | 78.9 | 86.2 | 80.3 |
| | 420 nm/700 nm | 4.9 | 7.1 | 6.4 | 9.0 | 7.6 | 1.0 | 0.7 | 0.8 | 0.7 | 0.7 | 0.8 | 0.6 | 0.9 | 0.6 | 0.9 |
| | 500 nm/700 nm | 2.6 | 2.9 | 2.5 | 7.1 | 5.3 | 1.0 | 0.9 | 0.8 | 0.7 | 0.8 | 0.9 | 0.9 | 1.1 | 0.8 | 1.4 |
| | 570 nm/700 nm | 3.2 | 2.7 | 3.1 | 4.0 | 5.0 | 2.3 | 1.7 | 2.1 | 2.0 | 1.6 | 2.0 | 1.7 | 2.5 | 1.6 | 2.6 |

TABLE 4

| Ink | | Gr1 | Gr2 | Gr3 | Gr4 | Gr5 | Gr6 | Gr7 | Gr8 | Gr9 | Gr10 | Gr11 | Gr12 | Gr13 | Gr14 |
|---|---|---|---|---|---|---|---|---|---|---|---|---|---|---|---|
| Spectral Reflectance | 420 nm | 42 | 42 | 44 | 40 | 48 | 39 | 36 | 82 | 67 | 30 | 20 | 13 | 35 | 48 |
| | 500 nm | 46 | 46 | 48 | 45 | 50 | 45 | 43 | 83 | 68 | 32 | 22 | 15 | 46 | 61 |
| | 570 nm | 48 | 48 | 50 | 47 | 50 | 48 | 47 | 83 | 69 | 33 | 23 | 16 | 38 | 69 |
| | 420 nm/500 nm | 91.3 | 91.3 | 91.7 | 88.9 | 96.0 | 86.7 | 83.7 | 98.8 | 98.5 | 93.8 | 90.9 | 86.7 | 76.1 | 78.7 |
| | 570 nm/500 nm | 104.3 | 104.3 | 104.2 | 104.4 | 100.0 | 106.7 | 109.3 | 100.0 | 101.5 | 103.1 | 104.5 | 106.7 | 82.6 | 113.1 |

| Ink | | Gr15 | Gr16 | Gr17 | Gr18 | Gr19 | Gr20 | Gr21 | Gr22 | Gr23 | Gr24 | Gr25 | Gr26 | Gr27 |
|---|---|---|---|---|---|---|---|---|---|---|---|---|---|---|
| Spectral Reflectance | 420 nm | 66 | 41 | 43 | 42 | 41 | 39 | 35 | 41 | 42 | 43 | 42 | 43 | 43 |
| | 500 nm | 68 | 46 | 45 | 45 | 45 | 44 | 43 | 45 | 47 | 45 | 45 | 48 | 46 |
| | 570 nm | 69 | 49 | 48 | 44 | 46 | 48 | 47 | 48 | 47 | 48 | 48 | 47 | 48 |
| | 420 nm/500 nm | 97.1 | 89.1 | 95.6 | 93.3 | 91.1 | 88.6 | 81.4 | 91.1 | 89.4 | 95.6 | 93.3 | 89.6 | 93.5 |
| | 570 nm/500 nm | 101.5 | 106.5 | 106.7 | 97.8 | 102.2 | 109.1 | 109.3 | 106.7 | 100.0 | 106.7 | 106.7 | 97.9 | 104.3 |

| Ink | | K1 | K2 | K3 | K4 | K5 | K6 | K7 | K8 |
|---|---|---|---|---|---|---|---|---|---|
| Spectral Reflectance | 420 nm | 1.7 | 1.7 | 1.7 | 1.7 | 1.7 | 1.7 | 1.7 | 1.7 |
| | 500 nm | 2.2 | 2.2 | 2.2 | 2.2 | 2.2 | 2.2 | 2.2 | 2.2 |
| | 570 nm | 2.4 | 2.4 | 2.4 | 2.4 | 2.4 | 2.4 | 2.4 | 2.4 |
| | 420 nm/500 nm | 77.3 | 77.3 | 77.3 | 77.3 | 77.3 | 77.3 | 77.3 | 77.3 |
| | 570 nm/500 nm | 91.7 | 91.7 | 91.7 | 91.7 | 91.7 | 91.7 | 91.7 | 91.7 |

Examples 1 to 57, Comparative Examples 1 to 11

<Evaluation of Ink Set>

Using a OnePass JET manufactured by Tritek Co., Ltd. equipped with an inkjet head (resolution 600 dpi×600 dpi) manufactured by Kyocera Corporation with combinations of inks given in Examples 1 to 57 and Comparative Examples 1 to 11 of Table 5 loaded therein as ink sets, printed color charts were produced using the same method as that described for the solid printed items above. Thereafter, each patch in the color chart images was measured with a measuring device (X-Rite 500 Series manufactured by X-Rite, Inc.), and based on the results thereof an optimum ICC profile was created for each ink set. Note that Profile Maker developed by X-Rite, Inc. was used to create the ICC profiles. Using these ICC profiles, the RGB data of an evaluation image, Pantone Warm Gray 4 (a single-color gray image), was color converted to CMYK color space data and used as evaluation image data. Note that Photoshop (registered trademark) developed by Adobe Inc. was used for the conversion.

Then, using the created evaluation image data, an image was printed on OK Topcoat+ manufactured by Oji Paper Co., Ltd. using the same device as that used for the printed color charts. Note that an ink droplet amount of 14 pL and a printing speed of 50 m/min were set as conditions. Furthermore, from among the ink sets for which "Yes" is indicated for being semi-cured or semi-dried in Table 5, ink sets other than the ink set of Example 42 were irradiated with an LED lamp (395 nm, 4 W/cm$^2$) manufactured by Phoseon Technology, 0.2 seconds after the third color was printed. Furthermore, hot air of 120° C. was blown onto the ink set of Example 42, 0.2 seconds after the third color was printed.

Then, after printing the fourth or fifth color, full-curing was performed using a 240-W/cm metal halide lamp manufactured by GEW Ltd. (except Example 42), or full-drying was performed by irradiating with an IR lamp (maximum output wavelength 2000 nm, 80 kW/m$^2$) manufactured by Heraeus Holding GmbH for 2 seconds (Example 42), to thereby obtain printed evaluation images.

<Evaluation of Metamerism>

The hue of the printed evaluation images obtained using the method described above and the hue of Pantone Warm Gray 4 (PANTONE [registered trademark] Plus SERIES), which is a color sample manufactured by Pantone LLC, were measured with a 2° viewing angle, illuminant D65, and CIE color system using the X-Rite 500 Series manufactured by X-Rite, Inc. to obtain the color difference (taken as $\Delta ED65^*$) between the printed evaluation images and the color sample. Furthermore, a color difference (taken as $\Delta ETL84^*$) was obtained in the same way as above with the exception of the measurement being carried out using TL84 as the light source. Then, using the formula below, a color difference (taken as $\Delta E^*$) between the two types of light sources was obtained for metamerism to be evaluated.

$$\Delta E^* = \{(\Delta ED65^*)^2 - (\Delta ETL84^*)^2\}^{1/2}$$

As described below in the evaluation criteria, 3 or above was taken as the level at which practical application presents no problems.
5: $\Delta E^* < 0.5$
4: $0.5 \leq \Delta E^* < 1$
3: $1 \leq \Delta E^* < 2$
2: $2 \leq \Delta E^* < 3$
1: $3 \leq \Delta E^*$ <Evaluation of Granularity>

The granularity of the printed evaluation images obtained using the method described above was evaluated with the naked eye. As described below in the evaluation criteria, 3 or above was taken as the level at which practical application presents no problems.
5: No graininess was visible in the image.
4: Graininess was slightly visible in the image (same level of granularity as that of a printed evaluation image produced using the ink set of Comparative Example 1).
3: Graininess was visible in the image to a small degree.
2: Graininess was visible in the image (same level of granularity as that of a printed evaluation image produced using the ink set of Comparative Example 4).
1: Graininess was visible in the image to a large degree.

<Evaluation of Beading>

Beading of the printed evaluation images obtained using the method described above was evaluated under an optical microscope at 50× magnification and with the naked eye. As described below in the evaluation criteria, 3 or above was taken as the level at which practical application presents no problems.
5: There was no beading even when checked under a microscope.
4: There was a very slight degree of beading when checked under a microscope, but beading was mostly not identified with the naked eye (same level of beading as that of a printed evaluation image produced using the ink set of Example 2).
3: There was a very slight degree of beading when checked with the naked eye.
2: There was a slight degree of beading when checked with the naked eye, and obvious color mixing between colors was evident (same level of beading as that of a printed evaluation image produced using the ink set of Comparative Example 2).
1: There was distinct beading when checked with the naked eye.

<Evaluation of Color Reproducibility>

Color reproducibility was evaluated by printing green, red, orange, and blue secondary color step charts as shown below using the obtained inks, and comparing the color charts with color samples manufactured by Panton LLC. As described below in the evaluation criteria, in each case 3 or above was taken as the level at which practical application presents no problems. In particular, those with small differences from the color samples in all of green, red, and blue were evaluated as having particularly excellent color reproducibility.
5: $\Delta E < 5$
4: $5 \leq \Delta E < 7$
3: $7 \leq \Delta E < 9$
2: $9 \leq \Delta E < 11$
1: $\Delta E \geq 11$ <Evaluation of Green Color Reproducibility>

A printed green secondary color step chart was produced using the same method as that described for the solid printed items above using cyan ink and yellow ink which form part of each ink set except for Comparative Examples 3 to 5. Note that the printed green secondary color step chart is an image having patches in which the coverage rate changes by 10% in each patch between 0 and 200% for the two color inks of the cyan ink and yellow ink (however, the coverage rates of the cyan ink and yellow ink were the same).

Next, the hue (L*, a*, b*) of each patch making up the printed green secondary color step chart obtained was measured with a 2° viewing angle, illuminant D65, and CIE color system using the X-Rite 500 Series manufactured by X-Rite, Inc.

The difference (ΔE) between the hue of each patch and the hue of Pantone [registered trademark] HEXACHROME Green, which is a color sample manufactured by Pantone LLC, was then calculated using the formula below.

$$\Delta E=\{(L-L^*)^2+(a-a^*)^2+(b-b^*)^2\}^{1/2}$$

In the above formula, L, a, and b are hue values of the color sample, and L*, a*, and b* are hue values of the printed secondary color step chart.

Note that ΔE given above was calculated for each patch, and the patch having the lowest ΔE was evaluated based on the evaluation criteria above.

<Evaluation of Red Color Reproducibility>

A printed red secondary color step chart was produced using the same method as that described for the solid printed items above using yellow ink and magenta ink which form part of each ink set except for Comparative Examples 3 to 5. Using the same method as that described for the evaluation of green color reproducibility, the hue of each patch was measured and the difference (ΔE) between the hue of each of the patches and the hue of Pantone [registered trademark] WARM RED, which is a color sample manufactured by Pantone LLC, was calculated using the formula given above. The ΔE shown above was then calculated for each patch, and the patch having the lowest ΔE was evaluated based on the evaluation criteria above.

<Evaluation of Blue Color Reproducibility>

A printed blue secondary color step chart was produced using the same method as that described for the solid printed items above using cyan ink and magenta ink which form part of each ink set except for Comparative Examples 3 to 5. Using the same method as that described for the evaluation of green color reproducibility, the hue of each patch was then measured and the difference (ΔE) between the hue of each of the patches and the hue of Pantone [registered trademark] Reflex Blue, which is a color sample manufactured by Pantone LLC, was calculated using the formula given above. The ΔE shown above was then calculated for each patch, and the patch having the lowest ΔE was evaluated based on the evaluation criteria above.

<Evaluation of Coating Film Durability>

Using a cotton swab immersed in ethanol at a concentration of 50%, a printed evaluation image obtained using the method described above was rubbed 10 times under a loading condition of approximately 100 g, and the coating film durability of each ink set was evaluated from the printed item surface and the state of color transfer to the cotton swab. As described below in the evaluation criteria, in each case 3 or above was taken as the level at which practical application presents no problems.

5: There were no rubbing marks on the printed item surface, and there was no color transfer to the cotton swab.
4: There were no rubbing marks on the printed item surface, but there was slight color transfer to the cotton swab.
3: There were slight rubbing marks on the printed item surface, and color transfer to the cotton swab was visible.
2: There were large rubbing marks on the printed item surface, and there was a large degree of color transfer to the cotton swab.
1: Ink peeled away from the printed item surface, and the surface of the recording medium was visible.

<Evaluation of Curability>

The cured film surface of the printed evaluation images obtained using the method described above was scraped with a fingernail and the tackiness of the printed item surface was evaluated to thereby evaluate curability. As described below in the evaluation criteria, 3 or above was taken as the level at which practical application presents no problems.

5: The cured film did not peel away even when scraped strongly with a fingernail, and there was no tackiness (feeling of adhesion) to the surface.
4: The cured film partially peeled away when scraped strongly with a fingernail, but there was no tackiness to the surface.
3: The cured film partially peeled away when scraped with a fingernail, but there was no tackiness to the surface.
2: The cured film partially peeled away when scraped with a fingernail, and there was a small degree of tackiness to the surface.
1: The cured film easily peeled away when struck with a fingernail, and there was tackiness to the surface.

TABLE 5

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Printing Conditions | Printing Order | 1st Color | C2 | C2 | C2 | C2 | C2 | C2 | C2 | C2 | C2 | C2 | C2 |
| | | 2nd Color | M9 | M9 | M9 | M9 | M9 | M1 | M2 | M4 | M5 | M6 | M7 |
| | | 3rd Color | Y3 | Y3 | Y3 | Y3 | Y3 | Y3 | Y3 | Y3 | Y3 | Y3 | Y3 |
| | | 4th Color | Gr1 | Gr1 | Gr1 | Gr1 | Gr1 | Gr1 | Gr1 | Gr1 | Gr1 | Gr1 | Gr1 |
| | | 5th Color | K1 | K1 | | K1 | K1 | K1 | K1 | K1 | K1 | K1 | K1 |
| | Semi-Curing or Semi-Drying | | YES | NO | YES | YES | YES | YES | YES | YES | YES | YES | YES |
| | Gray Coverage Rate | | 50% | 50% | 50% | 30% | 80% | 50% | 50% | 50% | 50% | 50% | 50% |
| Evaluation Results | Metamerism | | 5 | 4 | 4 | 4 | 5 | 3 | 5 | 5 | 5 | 5 | 5 |
| | Granularity | | 5 | 5 | 5 | 4 | 5 | 5 | 5 | 5 | 5 | 5 | 5 |
| | Beading | | 5 | 4 | 5 | 5 | 5 | 5 | 5 | 5 | 5 | 5 | 5 |
| | Color Reproducibility Green | | 5 | 5 | 5 | 5 | 5 | 5 | 5 | 5 | 5 | 5 | 5 |
| | Color Reproducibility Red | | 5 | 5 | 5 | 5 | 5 | 4 | 5 | 5 | 5 | 5 | 5 |
| | Color Reproducibility Blue | | 4 | 4 | 4 | 4 | 4 | 5 | 3 | 4 | 4 | 4 | 4 |

TABLE 5-continued

|  |  |  |  |  |  |  |  |  |  |  |  |
|---|---|---|---|---|---|---|---|---|---|---|---|
|  | Coating Film Durability | 5 | 5 | 5 | 5 | 5 | 5 | 5 | 5 | 5 | 5 | 5 |
|  | Curability | 5 | 5 | 5 | 5 | 5 | 5 | 5 | 5 | 5 | 5 | 5 |

|  |  |  | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|---|
| Printing Conditions | Printing Order | 1st Color | C2 | C2 | C2 | C2 | C2 | C2 | C2 | C2 | C2 | C2 | C2 |
|  |  | 2nd Color | M8 | M11 | M12 | M13 | M15 | M16 | M17 | M18 | M19 | M20 | M9 |
|  |  | 3rd Color | Y3 | Y3 | Y3 | Y3 | Y3 | Y3 | Y3 | Y3 | Y3 | Y3 | Y3 |
|  |  | 4th Color | Gr1 | Gr1 | Gr1 | Gr1 | Gr1 | Gr1 | Gr1 | Gr1 | Gr1 | Gr1 | Gr2 |
|  |  | 5th Color | K1 | K1 | K1 | K1 | K1 | K1 | K1 | K1 | K1 | K1 | K1 |
|  | Semi-Curing or Semi-Drying |  | YES | YES | YES | YES | YES | YES | YES | YES | YES | YES | YES |
|  | Gray Coverage Rate |  | 50% | 50% | 50% | 50% | 50% | 50% | 50% | 50% | 50% | 50% | 50% |
| Evaluation Results | Metamerism |  | 5 | 5 | 4 | 5 | 5 | 5 | 5 | 5 | 5 | 5 | 3 |
|  | Granularity |  | 5 | 5 | 5 | 5 | 5 | 5 | 5 | 5 | 5 | 5 | 5 |
|  | Beading |  | 5 | 5 | 5 | 5 | 5 | 5 | 5 | 5 | 5 | 5 | 3 |
|  | Color Reproducibility Green |  | 5 | 5 | 5 | 5 | 5 | 5 | 5 | 5 | 5 | 5 | 5 |
|  | Color Reproducibility Red |  | 5 | 5 | 5 | 4 | 5 | 5 | 5 | 5 | 5 | 5 | 5 |
|  | Color Reproducibility Blue |  | 4 | 4 | 4 | 3 | 5 | 5 | 5 | 5 | 5 | 5 | 4 |
|  | Coating Film Durability |  | 5 | 5 | 5 | 5 | 5 | 5 | 5 | 5 | 5 | 5 | 5 |
|  | Curability |  | 5 | 5 | 5 | 5 | 5 | 5 | 5 | 5 | 5 | 5 | 5 |

|  |  |  | Example 23 | Example 24 | Example 25 | Example 26 | Example 27 | Example 28 | Example 29 | Example 30 | Example 31 | Example 32 | Example 33 |
|---|---|---|---|---|---|---|---|---|---|---|---|---|---|
| Printing Conditions | Printing Order | 1st Color | C2 | C2 | C2 | C1 | C4 | C2 | C2 | C2 | C2 | C2 | C2 |
|  |  | 2nd Color | M9 | M9 | M9 | M9 | M9 | M9 | M9 | M9 | M9 | M9 | M9 |
|  |  | 3rd Color | Y3 | Y3 | Y3 | Y3 | Y3 | Y1 | Y2 | Y5 | Y6 | Y3 | Y3 |
|  |  | 4th Color | Gr9 | Gr10 | Gr11 | Gr1 | Gr1 | Gr1 | Gr1 | Gr1 | Gr1 | Gr3 | Gr4 |
|  |  | 5th Color | K1 | K1 | K1 | K1 | K1 | K1 | K1 | K1 | K1 | K1 | K1 |
|  | Semi-Curing or Semi-Drying |  | YES | YES | YES | YES | YES | YES | YES | YES | YES | YES | YES |
|  | Gray Coverage Rate |  | 50% | 50% | 50% | 50% | 50% | 50% | 50% | 50% | 50% | 50% | 50% |
| Evaluation Results | Metamerism |  | 4 | 5 | 5 | 5 | 5 | 4 | 4 | 5 | 5 | 4 | 5 |
|  | Granularity |  | 5 | 5 | 4 | 5 | 5 | 5 | 5 | 5 | 5 | 5 | 5 |
|  | Beading |  | 5 | 5 | 5 | 5 | 5 | 5 | 5 | 5 | 5 | 5 | 5 |
|  | Color Reproducibility Green |  | 5 | 5 | 5 | 5 | 3 | 3 | 4 | 5 | 5 | 5 | 5 |
|  | Color Reproducibility Red |  | 5 | 5 | 5 | 5 | 5 | 5 | 5 | 5 | 5 | 5 | 5 |
|  | Color Reproducibility Blue |  | 4 | 4 | 4 | 4 | 5 | 4 | 4 | 4 | 4 | 4 | 4 |
|  | Coating Film Durability |  | 5 | 5 | 5 | 5 | 5 | 5 | 5 | 5 | 5 | 5 | 5 |
|  | Curability |  | 5 | 5 | 5 | 5 | 5 | 5 | 5 | 5 | 5 | 4 | 5 |

|  |  |  | Example 34 | Example 35 | Example 36 | Example 37 | Example 38 | Example 39 | Example 40 | Example 41 | Example 42 | Example 43 | Example 44 | Example 45 |
|---|---|---|---|---|---|---|---|---|---|---|---|---|---|---|
| Printing Conditions | Printing Order | 1st Color | C2 | C2 | C2 | C3 | Y3 | Y3 | M9 | Gr1 | C5 | C2 | C2 | C2 |
|  |  | 2nd Color | M9 | M9 | M9 | M10 | M9 | C2 | Y3 | C2 | M21 | M9 | M9 | M9 |
|  |  | 3rd Color | Y3 | Y3 | Y3 | Y4 | C2 | M9 | C2 | M9 | Y7 | Y3 | Y3 | Y3 |
|  |  | 4th Color | Gr5 | Gr6 | Gr7 | Gr1 | Gr1 | Gr1 | Gr1 | Y3 | Gr15 | Gr16 | Gr17 | Gr18 |
|  |  | 5th Color | K1 | K1 | K1 | K1 | K1 | K1 | K1 | K1 | K2 | K1 | K1 | K1 |
|  | Semi-Curing or Semi-Drying |  | YES | YES | YES | YES | YES | YES | YES | NO | YES | YES | YES | YES |
|  | Gray Coverage Rate |  | 50% | 50% | 50% | 50% | 50% | 50% | 50% | 50% | 50% | 50% | 50% | 50% |
| Evaluation Results | Metamerism |  | 5 | 4 | 3 | 5 | 5 | 5 | 5 | 3 | 5 | 5 | 4 | 5 |
|  | Granularity |  | 5 | 5 | 5 | 5 | 5 | 5 | 5 | 5 | 5 | 5 | 5 | 5 |
|  | Beading |  | 5 | 5 | 5 | 5 | 5 | 5 | 5 | 3 | 5 | 5 | 5 | 5 |
|  | Color Reproducibility Green |  | 5 | 5 | 5 | 5 | 5 | 5 | 5 | 5 | 4 | 5 | 5 | 5 |

TABLE 5-continued

|  |  | Example 35 | Example 36 | Example 37 | Example 38 | Example 39 | Example 40 | Example 41 | Example 42 | Example 43 | Example 44 | Example 45 |
|---|---|---|---|---|---|---|---|---|---|---|---|---|
| Color Reproducibility Red | | 5 | 5 | 5 | 5 | 5 | 5 | 5 | 5 | 4 | 5 | 5 | 5 |
| Color Reproducibility Blue | | 4 | 4 | 4 | 4 | 4 | 4 | 4 | 4 | 3 | 4 | 4 | 4 |
| Coating Film Durability | | 4 | 5 | 5 | 3 | 5 | 5 | 5 | 5 | 3 | 5 | 5 | 5 |
| Curability | | 4 | 5 | 5 | 3 | 5 | 5 | 5 | 5 | — | 5 | 4 | 5 |

|  |  |  | Example 46 | Example 47 | Example 48 | Example 49 | Example 50 | Example 51 | Example 52 | Example 53 | Example 54 | Example 55 | Example 56 | Example 57 |
|---|---|---|---|---|---|---|---|---|---|---|---|---|---|---|
| Printing Conditions | Printing Order | 1st Color | C2 | C2 | C2 | C6 | C7 | C8 | C9 | C10 | C11 | C2 | C2 | C2 |
|  |  | 2nd Color | M9 | M9 | M9 | M22 | M23 | M24 | M25 | M26 | M27 | M28 | M29 | M30 |
|  |  | 3rd Color | Y3 | Y3 | Y3 | Y8 | Y9 | Y10 | Y11 | Y12 | Y13 | Y3 | Y3 | Y3 |
|  |  | 4th Color | Gr19 | Gr20 | Gr21 | Gr22 | Gr23 | Gr24 | Gr25 | Gr26 | Gr27 | Gr1 | Gr1 | Gr1 |
|  |  | 5th Color | K1 | K1 | K1 | K3 | K4 | K5 | K6 | K7 | K8 | K1 | K1 | K1 |
|  | Semi-Curing or Semi-Drying |  | YES | YES | YES | YES | YES | YES | YES | YES | YES | YES | YES | YES |
|  | Gray Coverage Rate |  | 50% | 50% | 50% | 50% | 50% | 50% | 50% | 50% | 50% | 50% | 50% | 50% |
| Evaluation Results | Metamerism |  | 5 | 4 | 3 | 5 | 5 | 3 | 5 | 4 | 3 | 4 | 5 | 4 |
|  | Granularity |  | 5 | 5 | 5 | 5 | 5 | 5 | 5 | 5 | 5 | 5 | 5 | 5 |
|  | Beading |  | 5 | 5 | 5 | 5 | 5 | 5 | 5 | 5 | 5 | 5 | 5 | 5 |
|  | Color Reproducibility Green |  | 5 | 5 | 5 | 5 | 5 | 5 | 5 | 5 | 5 | 5 | 5 | 5 |
|  | Color Reproducibility Red |  | 5 | 5 | 5 | 5 | 5 | 5 | 5 | 5 | 5 | 4 | 5 | 4 |
|  | Color Reproducibility Blue |  | 4 | 4 | 4 | 4 | 4 | 4 | 4 | 4 | 4 | 4 | 4 | 3 |
|  | Coating Film Durability |  | 4 | 5 | 5 | 5 | 4 | 3 | 5 | 5 | 5 | 5 | 5 | 5 |
|  | Curability |  | 4 | 5 | 5 | 5 | 4 | 3 | 5 | 5 | 5 | 5 | 4 | 5 |

|  |  |  | Comparitive Example 1 | Comparitive Example 2 | Comparitive Example 3 | Comparitive Example 4 | Comparitive Example 5 | Comparitive Example 6 |
|---|---|---|---|---|---|---|---|---|
| Printing Conditions | Printing Order | 1st Color | C2 | C2 | Gr1 | Gr1 | K1 | C2 |
|  |  | 2nd Color | M9 | M9 | K1 | K1 |  | M9 |
|  |  | 3rd Color | Y3 | Y3 |  |  |  | Y3 |
|  |  | 4th Color |  | K1 |  |  |  | Gr8 |
|  |  | 5th Color |  |  |  |  |  | K1 |
|  | Semi-Curing or Semi-Drying |  | NO | YES | — | — | — | YES |
|  | Gray Coverage Rate |  | — | — | 50% | 100% | — | 50% |
| Evaluation Results | Metamerism |  | 1 | 2 | 5 | 5 | 5 | 2 |
|  | Granularity |  | 4 | 3 | 1 | 2 | 1 | 5 |
|  | Beading |  | 3 | 2 | 1 | 2 | 1 | 5 |
|  | Color Reproducibility Green |  | 5 | 5 | — | — | — | 5 |
|  | Color Reproducibility Red |  | 5 | 5 | — | — | — | 5 |
|  | Color Reproducibility Blue |  | 4 | 4 | — | — | — | 4 |
|  | Coating Film Durability |  | 5 | 5 | 5 | 5 | 5 | 5 |
|  | Curability |  | 5 | 5 | 5 | 5 | 5 | 5 |

|  |  |  | Comparitive Example 7 | Comparitive Example 8 | Comparitive Example 9 | Comparitive Example 10 | Comparitive Example 11 |
|---|---|---|---|---|---|---|---|
| Printing Conditions | Printing Order | 1st Color | C2 | C2 | C2 | C2 | C2 |
|  |  | 2nd Color | M9 | M9 | M9 | M3 | M14 |
|  |  | 3rd Color | Y3 | Y3 | Y3 | Y3 | Y3 |
|  |  | 4th Color | Gr12 | Gr13 | Gr14 | Gr1 | Gr1 |
|  |  | 5th Color | K1 | K1 | K1 | K1 | K1 |
|  | Semi-Curing or Semi-Drying |  | YES | YES | YES | YES | YES |
|  | Gray Coverage Rate |  | 50% | 50% | 50% | 50% | 50% |
| Evaluation Results | Metamerism |  | 2 | 2 | 1 | 2 | 2 |
|  | Granularity |  | 5 | 5 | 5 | 5 | 5 |

TABLE 5-continued

|  | | | | | | |
|---|---|---|---|---|---|---|
| | Beading | 5 | 5 | 5 | 5 | 5 |
| | Color Reproducibility Green | 5 | 5 | 5 | 5 | 5 |
| | Color Reproducibility Red | 5 | 5 | 5 | 2 | 5 |
| | Color Reproducibility Blue | 4 | 4 | 4 | 5 | 3 |
| | Coating Film Durability | 5 | 5 | 5 | 5 | 5 |
| | Curability | 5 | 5 | 5 | 5 | 5 |

According to embodiments of the present invention, it was found that it is possible to obtain an ink set for single-pass printing including at least a cyan ink, a magenta ink, a yellow ink, and a gray ink, which has excellent weather resistance and color reproducibility and improved granularity and metamerism.

Next, the effect of the water content in the magenta ink was evaluated.

The water content of magenta ink M9 was measured using a Karl Fischer moisture meter (Karl Fischer Moisture Titrator MKV-710 manufactured by Kyoto Electronics Manufacturing Co., Ltd.), and was 0.8% by mass. Then, 1 part of water was added to 100 parts of the magenta ink M9 to produce magenta ink M31 (water content 1.8% by mass). Furthermore, 1.7 parts of water was added to 100 parts of the magenta ink M9 to produce magenta ink M32 (water content 2.5% by mass). In addition, 2.5 parts of water was added to 100 parts of the magenta ink M9 to produce magenta ink M33 (water content 3.2% by mass).

Examples 58 to 60

Using a OnePass JET manufactured by Tritek Co., Ltd. equipped with an inkjet head (resolution 600 dpi×600 dpi) manufactured by Kyocera Corporation with combinations of inks listed in Table 6 loaded therein as ink sets, printed evaluation images were obtained using the same method as that for Example 1 described above. The obtained printed evaluation images were then each subjected to a metamerism evaluation, a granularity evaluation, a beading evaluation, a color reproducibility evaluation, and a color reproducibility evaluation (green, red, and blue) using the methods described above.

Evaluation results for the metamerism evaluation, granularity evaluation, beading evaluation, color reproducibility evaluation, and color reproducibility evaluation (green, red, and blue) for the ink sets listed in Table 6 are as shown in Table 6.

TABLE 6

| | | | Example 58 | Example 59 | Example 60 |
|---|---|---|---|---|---|
| Printing Conditions | Printing Order | 1st Color | C2 | C2 | C2 |
| | | 2nd Color | M31 | M32 | M33 |
| | | 3rd Color | Y3 | Y3 | Y3 |
| | | 4th Color | Gr1 | Gr1 | Gr1 |
| | | 5th Color | K1 | K1 | K1 |
| | Semi-Curing or Semi-Drying | | YES | NO | YES |
| | Gray Coverage Rate | | 50% | 50% | 50% |

TABLE 6-continued

| | | Example 58 | Example 59 | Example 60 |
|---|---|---|---|---|
| Evaluation Results | Metamerism | 5 | 4 | 3 |
| | Granularity | 5 | 5 | 5 |
| | Beading | 5 | 5 | 5 |
| | Color Reproducibility Green | 5 | 5 | 5 |
| | Color Reproducibility Red | 5 | 4 | 3 |
| | Color Reproducibility Blue | 4 | 4 | 3 |

The invention claimed is:

1. An ink set for single-pass printing including at least a cyan ink, a magenta ink, a yellow ink, and a gray ink, wherein a spectral reflectance of the magenta ink satisfies formulas (1) to (3) below, a pigment exhibiting a magenta color of the magenta ink is one or more types of pigment selected from a group consisting of C.I. Pigment RED 48:1, 112, 146, 166, 177, 179, 202, 237, 242, 254, 255, 264, 282, and C.I. Pigment Violet 19, a content of the pigment exhibiting the magenta color is 0.1 to 10% by mass, the gray ink has a spectral reflectance at a wavelength of 500 nm of 20 to 70% and satisfies formulas (4) and (5) below, and all inks constituting the ink set are active energy ray-curable inks including a polymerizable compound and a polymerization initiator, in the magenta ink a value obtained by dividing a 90% diameter by a primary particle size of pigments is 2 to 20, in the gray ink a value obtained by dividing a 90% diameter by a primary particle size of pigments is 2 to 30, and the 90% diameters are volume-based values measured using a dynamic light scattering method, $$\text{(Spectral reflectance at a wavelength of 420 nm)} \div \text{(Spectral reflectance at a wavelength of 700 nm)} \times 100 \leq 40 \quad \text{Formula (1)}$$

$$\text{(Spectral reflectance at a wavelength of 500 nm)} \div \text{(Spectral reflectance at a wavelength of 700 nm)} \times 100 \leq 10 \quad \text{Formula (2)}$$

$$\text{(Spectral reflectance at a wavelength of 570 nm)} \div \text{(Spectral reflectance at a wavelength of 700 nm)} \times 100 \leq 20 \quad \text{Formula (3)}$$

$80 \leq$ (Spectral reflectance at a wavelength of 420 nm)÷(Spectral reflectance at a wavelength of 500 nm)×100≤110  Formula (4)

$80 \leq$ (Spectral reflectance at a wavelength of 570 nm)÷(Spectral reflectance at a wavelength of 500 nm)×100≤110.  Formula (5)

2. The ink set for single-pass printing according to claim 1, wherein,
when a hue angle defined in a CIELAB color space is H°, the hue angle H° of the cyan ink is 200 to 290°,
the hue angle H° of the magenta ink is 0 to 45°, and
the hue angle H° of the yellow ink is 80 to 110°.

3. The ink set for single-pass printing according to claim 1, wherein a static surface tension at 25° C. of the gray ink is lower than a static surface tension at 25° C. of any of the cyan ink, the magenta ink, and the yellow ink.

4. The ink set for single-pass printing according to claim 1, further including a black ink.

5. The ink set for single-pass printing according to claim 1, wherein, in the polymerization initiator included in the gray ink, a total amount of a thioxanthone-based compound and an α-aminoalkylphenone-based compound is less than 3% by mass relative to a total mass of ink.

6. A recording method using the ink set for single-pass printing according to claim 1, wherein
a step of printing the gray ink is performed after a step of printing the cyan ink, the magenta ink, and the yellow ink.

7. The recording method according to claim 6, including a step of semi-drying or semi-curing a printed ink, between the step of printing the cyan ink, the magenta ink, and the yellow ink and the step of printing the gray ink.

8. The recording method according to claim 6, including a step of printing a black ink after the step of printing the gray ink.

9. A printed item obtained by printing the ink set for single-pass printing according to claim 1 onto a substrate.

10. A printed item that is printed using the recording method according to claim 6.

11. The ink set for single-pass printing according to claim 2, wherein,
the hue angle H° of the cyan ink is 200 to 219°, and
the hue angle H° of the yellow ink is 80 to 89°.

12. The ink set for single-pass printing according to claim 5, wherein, in the polymerization initiator included in the gray ink, the total amount of a thioxanthone-based compound and the α-aminoalkylphenone-based compound is less than 2% by mass relative to a total mass of ink.

13. The recording method according to claim 6, including a step of semi-curing a printed ink, between the step of printing the cyan ink, the magenta ink, and the yellow ink and the step of printing the gray ink, and
wherein the step of semi-curing the printed ink comprises controlling a radiation of an active energy ray to the printed ink.

* * * * *